(12) United States Patent
Son et al.

(10) Patent No.: US 10,437,105 B2
(45) Date of Patent: Oct. 8, 2019

(54) OPTICAL FILM AND LIQUID CRYSTAL DISPLAY DEVICE INCLUDING THE SAME

(71) Applicant: SAMSUNG DISPLAY CO., LTD., Yongin-si, Gyeonggi-do (KR)

(72) Inventors: Ocksoo Son, Seoul (KR); Sungin Ro, Hwaseong-si (KR); Youngjin Park, Suwon-si (KR); Junho Song, Seongnam-si (KR); Jaehak Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 2 days.

(21) Appl. No.: 15/454,150

(22) Filed: Mar. 9, 2017

(65) Prior Publication Data

US 2017/0261793 A1    Sep. 14, 2017

(30) Foreign Application Priority Data

Mar. 10, 2016 (KR) .................. 10-2016-0029132

(51) Int. Cl.
*G02F 1/13363* (2006.01)
*G02F 1/1335* (2006.01)

(52) U.S. Cl.
CPC .... *G02F 1/13363* (2013.01); *G02F 1/133504* (2013.01); *G02F 1/133528* (2013.01); *G02F 1/133553* (2013.01); *G02F 2001/133562* (2013.01); *G02F 2001/133638* (2013.01); *G02F 2413/02* (2013.01); *G02F 2413/06* (2013.01); *G02F 2413/11* (2013.01); *G02F 2413/14* (2013.01)

(58) Field of Classification Search
CPC ... G02F 2001/133638; G02F 1/133555; G02F 1/13363; G02F 2413/11; G02F 2413/02; G92F 1/133504
See application file for complete search history.

(56) References Cited

U.S. PATENT DOCUMENTS

| 2007/0195236 | A1* | 8/2007 | Kim ................. G02F 1/133555 349/114 |
| 2009/0059145 | A1* | 3/2009 | Nishioka ............. G02F 1/13363 349/119 |
| 2010/0062174 | A1 | 3/2010 | Shiojiri et al. |

(Continued)

FOREIGN PATENT DOCUMENTS

| JP | 2010058436 A | 3/2010 |
| JP | 2013019988 A | 7/2011 |

(Continued)

*Primary Examiner* — Jessica M Merlin
(74) *Attorney, Agent, or Firm* — Cantor Colburn LLP

(57) ABSTRACT

An optical film includes a negative C-plate, a light diffusion layer on the negative C-plate, and a polarizer on the negative C-plate where the polarizer includes a linear polarizer and a retardation plate on the linear polarizer, the light diffusion layer includes a first light-transmissive base and a plurality of first rods that have a different refractive index from that of the first light-transmissive base and are aligned at a first inclination angle within the first light-transmissive base, and the negative C-plate has an x-axis refractive index Nx, a y-axis refractive index Ny, and a z-axis refractive index Nz, where "Nx>Nz" and "Ny>Nz."

23 Claims, 24 Drawing Sheets

(56) References Cited

U.S. PATENT DOCUMENTS

| | | | | |
|---|---|---|---|---|
| 2011/0037927 | A1* | 2/2011 | Hara | G02B 6/005 |
| | | | | 349/67 |
| 2012/0140150 | A1* | 6/2012 | Matsushima | G02F 1/133502 |
| | | | | 349/96 |
| 2015/0378079 | A1 | 12/2015 | Takagi et al. | |
| 2016/0025907 | A1* | 1/2016 | Kusama | C08F 299/065 |
| | | | | 359/599 |
| 2016/0077246 | A1* | 3/2016 | Kusama | G02B 1/04 |
| | | | | 359/599 |
| 2017/0075166 | A1 | 3/2017 | Son et al. | |

FOREIGN PATENT DOCUMENTS

| | | |
|---|---|---|
| KR | 1020070035822 A | 4/2007 |
| KR | 1020150114946 A | 10/2015 |
| KR | 1020150137367 A | 12/2015 |
| KR | 1020170033456 A | 3/2017 |

\* cited by examiner

OPTICAL FILM AND LIQUID CRYSTAL DISPLAY DEVICE INCLUDING THE SAME

This application claims priority to Korean Patent Application No. 10-2016-0029132, filed on Mar. 10, 2016, and all the benefits accruing therefrom under 35 U.S.C. § 119, the content of which in its entirety is herein incorporated by reference.

BACKGROUND

1. Field

Exemplary embodiments of the invention relate to an optical film and a liquid crystal display ("LCD") device including the optical film, and more particularly, to an optical film applicable to a reflective LCD device and a reflective LCD device including the optical film.

2. Description of the Related Art

In recent times, a display device that displays an image using a display panel such as a liquid crystal display ("LCD") panel, a plasma display panel ("PDP"), an electroluminescence ("EL") display panel, and an organic light emitting diode ("OLED") display panel is garnering attention.

Among various types of display devices, an LCD device includes the LCD panel and displays an image by adjusting liquid crystal alignment to control transmittance of light. Such an LCD device is a display device that may not emit light by itself. Accordingly, a transmissive-type LCD device includes a backlight assembly that provides light to the LCD panel. However, the backlight assembly is substantially thick and heavy, and consumes a relatively large power.

A display device that may be driven with a relatively less power may include a reflective LCD device, for example. The reflective LCD device adjusts light transmittance by reflecting natural light or external artificial light. Accordingly, the reflective LCD device is substantially thin and consumes relatively less power, as compared to the transmissive LCD device.

Such a reflective LCD device includes an optical film to control light transmittance.

SUMMARY

Exemplary embodiments of the invention are directed to a reflective liquid crystal display ("LCD") device that has an excellent contrast ratio and displays distinct colors.

Further, exemplary embodiments of the invention are directed to an optical film applicable to a reflective LCD device.

According to an exemplary embodiment of the invention, an optical film includes a negative C-plate, a light diffusion layer on the negative C-plate, and a polarizer on the negative C-plate. The polarizer includes a linear polarizer and a retardation plate on the linear polarizer, the light diffusion layer includes a first light-transmissive base and a plurality of first rods that are disposed in the first light-transmissive base, have a refractive index different from a refractive index of the first light-transmissive base and are aligned at a first inclination angle with respect to a normal line of the first light-transmissive base, and the negative C-plate has an x-axis refractive index, a y-axis refractive index, and a z-axis refractive index, where the x-axis refractive index is greater than the z-axis refractive index and the y-axis refractive index is greater than the z-axis refractive index.

In an exemplary embodiment, the retardation plate may include a quarter wave plate.

In an exemplary embodiment, the retardation plate may include a half wave plate.

In an exemplary embodiment, the light diffusion layer may be disposed between the linear polarizer and the negative C-plate.

In an exemplary embodiment, the light diffusion layer may be disposed on a surface of the polarizer, and the negative C-plate may be disposed on another surface of the polarizer.

In an exemplary embodiment, the first inclination angle may be in a range of about 0 degree (°) to about 5°.

In an exemplary embodiment, the light diffusion layer may further include a plurality of second rods that have a refractive index different from the refractive index of the first light-transmissive base and are aligned at a second inclination angle in the first light-transmissive base, the second inclination angle being different from the first inclination angle.

In an exemplary embodiment, the second inclination angle may be in a range of about 5° to about 20°.

In an exemplary embodiment, the light diffusion layer may include a second light-transmissive base on the first light-transmissive base, and a plurality of third rods that have a different refractive index from that of the second light-transmissive base and are aligned at a third inclination angle in the second light-transmissive base.

In an exemplary embodiment, the third inclination angle may be in a range of about 5° to about 20° with respect to a normal line of the second light-transmissive base.

In an exemplary embodiment, the negative C-plate may have a surface-direction retardation value in a range of about 0 nanometer (nm) to about 5 nm.

In an exemplary embodiment, the x-axis refractive index and the y-axis refractive index may be the same as each other.

In an exemplary embodiment, the negative C-plate may have a thickness-direction retardation value in a range of about 192.5 nm to about 242.5 nm.

In an exemplary embodiment, the negative C-plate may have a thickness-direction retardation value in a range of about 180 nm to about 220 nm.

In an exemplary embodiment, the negative C-plate may have a thickness in a range of about 1 micrometer ($\mu$m) to about 30 $\mu$m.

In an exemplary embodiment, the negative C-plate may include a discotic compound.

In an exemplary embodiment, the negative C-plate may include at least one of polyarylate, polynorbornene, polycarbonate, polysulfone, polyimide, cellulose and derivatives thereof.

According to an exemplary embodiment of the invention, an LCD device includes a first substrate, a second substrate opposing the first substrate, a liquid crystal layer between the first substrate and the second substrate, and an optical film on the second substrate. The optical film includes a negative C-plate, a light diffusion layer on the negative C-plate, and a polarizer on the negative C-plate. The polarizer includes a linear polarizer and a retardation plate on the linear polarizer, the light diffusion layer includes a first light-transmissive base and a plurality of first rods that have a refractive index different from a refractive index of the first light-transmissive base and are aligned at a first inclination angle in the first light-transmissive base, and the negative C-plate has an x-axis refractive index Nx, a y-axis refractive index Ny, and a z-axis refractive index Nz, where "Nx>Nz" and "Ny>Nz."

In an exemplary embodiment, the LCD device may further include a reflection layer on the first substrate, and a pixel electrode on the reflection layer.

In an exemplary embodiment, the reflection layer may be insulated from the pixel electrode.

In an exemplary embodiment, the reflection layer may be electrically connected to the pixel electrode.

In an exemplary embodiment, the retardation plate may include a quarter wave plate.

In an exemplary embodiment, the retardation plate may further include a half wave plate.

In an exemplary embodiment, the negative C-plate may have a surface-direction retardation value in a range of about 0 nm to about 5 nm.

In an exemplary embodiment, the negative C-plate may have a thickness-direction retardation value in a range of about 192.5 nm to about 242.5 nm.

In an exemplary embodiment, the negative C-plate may have a thickness-direction retardation value in a range of about 180 nm to about 220 nm.

In an exemplary embodiment, the negative C-plate may be disposed between the polarizer and the second substrate.

In an exemplary embodiment, the LCD device may further include a common electrode disposed on the second substrate and opposing the pixel electrode.

In an exemplary embodiment, an interval between the pixel electrode and the common electrode may be in a range of about 1.4 μm to about 1.6 μm.

The foregoing is illustrative only and is not intended to be in any way limiting. In addition to the illustrative exemplary embodiments, and features described above, further exemplary embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1A:
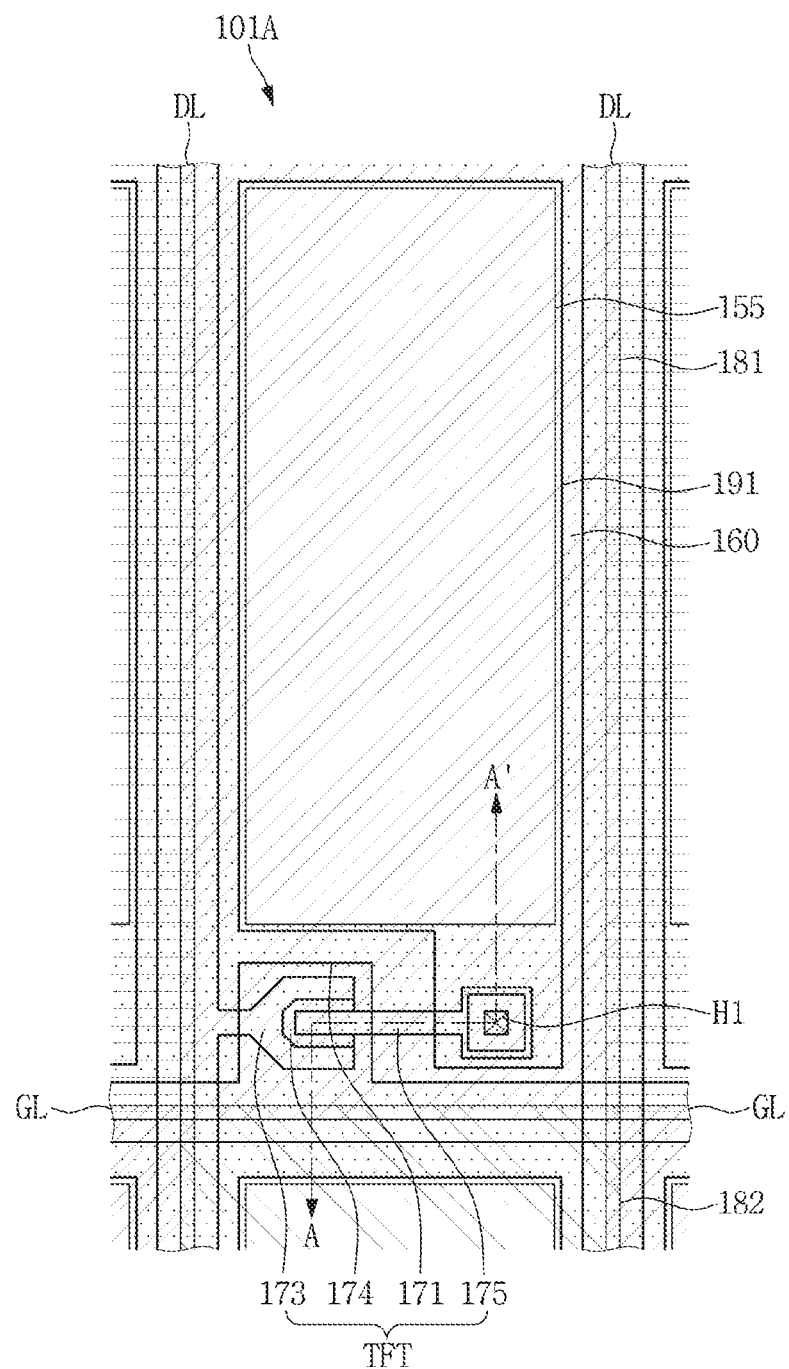
FIG. 1A is a plan view illustrating an exemplary embodiment of a liquid crystal display ("LCD") device.

Exemplary embodiments will now be described more fully hereinafter with reference to the accompanying drawings. Although the invention can be modified in various manners and have several embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, certain elements or shapes may be illustrated in an enlarged manner or in a simplified manner to better illustrate the invention, and other elements present in an actual product may also be omitted. Thus, the drawings are intended to facilitate the understanding of the invention.

When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be not including therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be not including therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means in an acceptable range of deviation for the particular value as determined by one of ordinary skill in the art, considering the measurement in question and the error associated with measurement of the particular quantity (i.e., the limitations of the measurement system). For example, "about" can mean in one or more standard deviations, or in ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, an exemplary embodiment will be described with reference to FIGS. 1A and 1B.

Figure 1B:
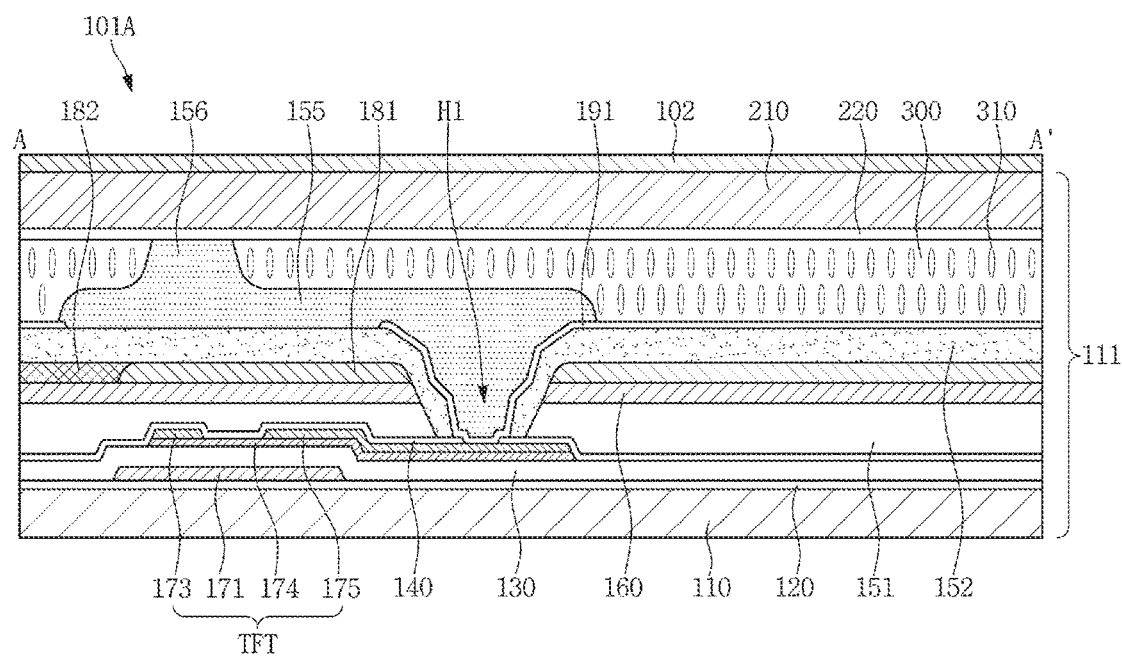
FIG. 1B is a cross-sectional view taken along line A-A' of FIG. 1A.

FIG. 1A is a plan view illustrating an exemplary embodiment of a liquid crystal display ("LCD") device 101A, and FIG. 1B is a cross-sectional view taken along line A-A' of FIG. 1A. The exemplary embodiment of the LCD device 101A includes an LCD panel 111 and an optical film 102 on the LCD panel 111.

The LCD panel 111 includes a first substrate 110, a second substrate 210 opposing the first substrate 110, and a liquid crystal layer 300 between the first substrate 110 and the second substrate 210. The optical film 102 is disposed on the second substrate 210.

In an exemplary embodiment, the first substrate 110 may include an insulating material including at least one of glass, quartz, ceramic, and plastic, for example. A buffer layer 120 is disposed on the first substrate 110. The buffer layer 120 may include at least one of various inorganic layers and various organic layers. In another exemplary embodiment, the buffer layer 120 may be omitted.

A gate electrode 171 is disposed on the buffer layer 120, and a gate insulating layer 130 is disposed on the gate electrode 171. The gate electrode 171 extends from a gate line GL.

A semiconductor layer 174 is disposed on the gate insulating layer 130. A source electrode 173 and a drain electrode 175 are disposed on the semiconductor layer 174 to overlap at least a portion of the semiconductor layer 174. The source electrode 173 and the drain electrode 175 are spaced apart from each other, and a channel area is defined therebetween.

The source electrode 173 extends from a data line DL, and the drain electrode 175 is electrically connected to a pixel electrode 191 through a contact hole H1.

The gate electrode 171, the semiconductor layer 174, the source electrode 173, and the drain electrode 175 collectively define a thin film transistor ("TFT"). A structure of the TFT illustrated in FIGS. 1A and 1B is referred to as a bottom gate structure. However, the invention is not limited thereto, and the TFT may have a top gate structure (refer to FIGS. 2A and 2B).

A passivation layer 140 is disposed on the source electrode 173 and the drain electrode 175.

A first protection layer 151 is disposed on the passivation layer 140. The first protection layer 151 may be a monolayer or a multilayer including an organic layer or an inorganic layer. In the illustrated exemplary embodiment in FIGS. 1A and 1B, the first protection layer 151 may be an organic layer.

A reflection layer 160 is disposed on the first protection layer 151. The reflection layer 160 is disposed in an area overlapping at least a portion of the pixel electrode 191. In an exemplary embodiment, the reflection layer 160 may include metal. In the exemplary embodiment, the reflection layer 160 may include a reflection layer including aluminum (Ag) or silver (Ag), for example. In an exemplary embodiment, the reflection layer 160 is insulated from the TFT. In an exemplary embodiment, the reflection layer 160 is disposed over the entire area of the first protection layer 151, except for an area around the contact hole H1 (i.e., an area represented by a quadrangular area around the contact hole H1 in FIG. 1A).

Figure 2A:
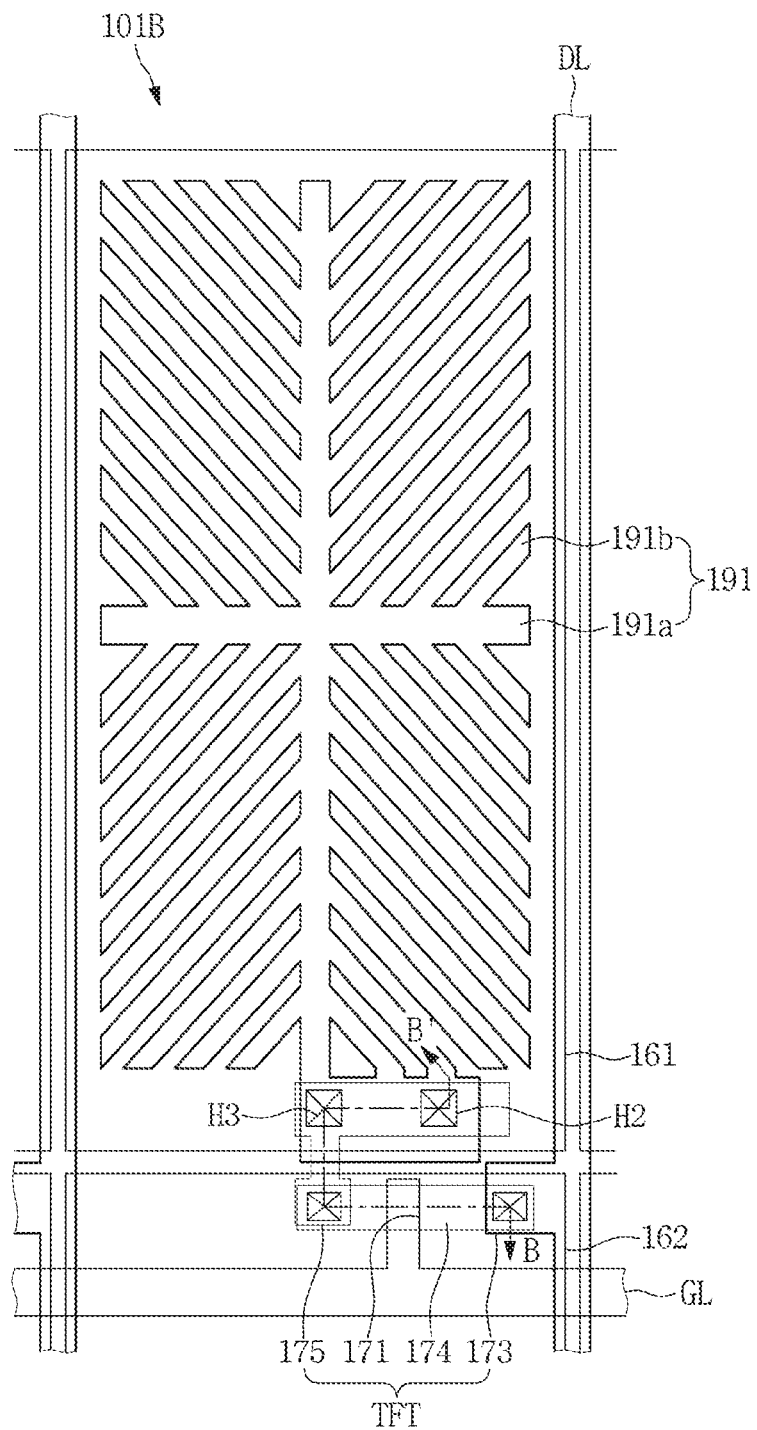
FIG. 2A is a plan view illustrating an alternative exemplary embodiment of an LCD device.
Figure 2B:
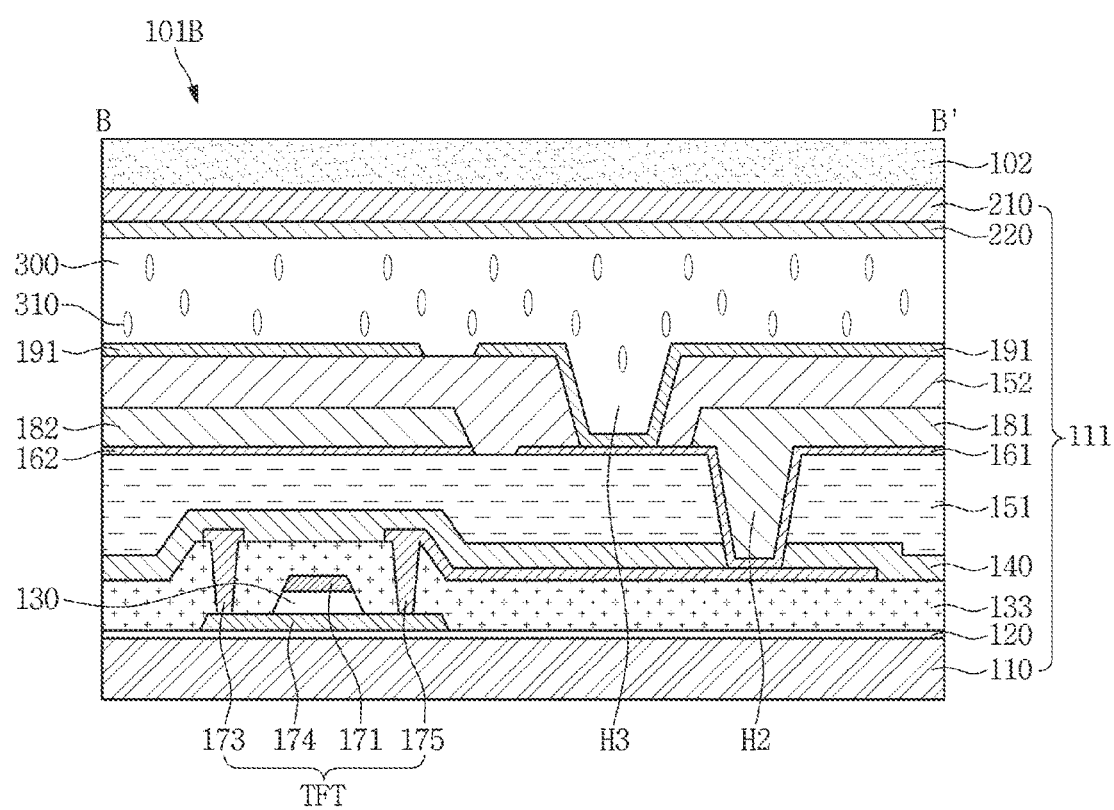
FIG. 2B is a cross-sectional view taken along line B-B' of FIG. 2A.

However, the invention is not limited thereto, and the reflection layer 160 may be patterned on each pixel and may be electrically connected to the TFT (refer to FIGS. 2A and 2B).

Color filters 181 and 182 are disposed on the reflection layer 160. In an exemplary embodiment, each of the color filters 181 and 182 may be one of a red filter, a green filter, and a blue filter, for example. In an exemplary embodiment, one of the color filters 181 and 182 may be a white filter, for example. However, the invention is not limited thereto, and the color filters 181 and 182 may include various other color filters. The color filters 181 and 182 are absent in the contact hole H1.

A second protection layer 152 is disposed on the color filters 181 and 182. The second protection layer 152 may be a monolayer or a multilayer including an organic layer or an inorganic layer. The second protection layer 152 may include the same material as a material included in the first protection layer 151.

Portions of the first protection layer 151 and the second protection layer 152 are removed such that the contact hole H1 exposing a portion of the drain electrode 175 is defined.

The pixel electrode 191 is disposed on the second protection layer 152. The pixel electrode 191 overlaps the reflection layer 160 and is disposed on each pixel. The pixel electrode 191 is electrically connected to the drain electrode 175 through the contact hole H1.

In an exemplary embodiment, the pixel electrode 191 may include a transparent conductive oxide ("TCO") such as indium tin oxide ("ITO"), indium zinc oxide ("IZO"), and aluminum doped zinc oxide ("AZO").

In addition, a light blocking layer 155 is disposed on the second protection layer 152. The light blocking layer 155 is also referred to as a black matrix, and is disposed among the pixel electrodes 191 to define a pixel area. The light blocking layer 155 may overlap a portion of the pixel electrode 191. Further, the light blocking layer 155 may be disposed to overlap the gate line GL, the data line DL, and the TFT.

The second substrate 210 is disposed to oppose the first substrate 110, and the liquid crystal layer 300 is disposed between the first substrate 110 and the second substrate 210.

In addition, a column spacer 156 which supports the first substrate 110 and the second substrate 210 is disposed between the first substrate 110 and the second substrate 210. The column spacer 156 may be unitary with the light blocking layer 155. The light blocking layer 155 and the column spacer 156 that have a unitary structure may be collectively referred to as a black column spacer BCS.

A common electrode 220 is disposed on the second substrate 210. In an exemplary embodiment, the common electrode 220 opposes the pixel electrode 191, and may include a TCO such as ITO, IZO, and AZO. An interval between the pixel electrode 191 and the common electrode 220 along a direction perpendicular to an extension direction of the common electrode 220 may be in a range of about 1.4 μm to about 1.6 μm, for example. The interval between the pixel electrode 191 and the common electrode 220 is also referred to as a cell gap.

An optical film 102 is disposed on the second substrate 210.

The first exemplary embodiment of the LCD device 101A is a reflective LCD device. The reflective LCD device displays an image using natural light or external light that is incident thereto. In an exemplary embodiment, natural light or external light that is incident to the reflection layer 160 of the reflective LCD device is reflected off from the reflection layer 160 to be transmitted through the color filters 181 and 182 and the liquid crystal layer 300, for example, such that an image may be displayed. The optical film 102 controls reflected light that is reflected from the reflection layer 160 so that the LCD device 101A may display an image.

FIG. 2A is a plan view illustrating an alternative exemplary embodiment of an LCD device 101B, and FIG. 2B is a cross-sectional view taken along line B-B' of FIG. 2A.

The LCD device 101B illustrated in FIGS. 2A and 2B includes a TFT having a top gate structure.

Referring to FIGS. 2A and 2B, a buffer layer 120 is disposed on a first substrate 110. A semiconductor layer 174 is disposed on the buffer layer 120, and a gate insulating layer 130 is disposed on the semiconductor layer 174. A gate electrode 171 is disposed on the gate insulating layer 130. The gate electrode 171 extends from a gate line GL. An insulating interlayer 133 is disposed on the gate electrode 171. The insulating interlayer 133 may include an organic layer or an inorganic layer having insulating characteristics.

A source electrode 173 and a drain electrode 175 are disposed on the insulating interlayer 133. Each of the source electrode 173 and the drain electrode 175 is connected to the semiconductor layer 174 through a contact hole defined in the insulating interlayer 133. The source electrode 173 extends from a data line DL, and the drain electrode 175 is electrically connected to a pixel electrode 191.

The semiconductor layer 174, the gate electrode 171, the source electrode 173, and the drain electrode 175, illustrated in FIGS. 2A and 2B, define a top-gate TFT.

A passivation layer 140 is disposed on the source electrode 173 and the drain electrode 175, and a first protection layer 151 is disposed on the passivation layer 140. Portions of the passivation layer 140 and the first protection layer 151 are removed such that a contact hole H2 exposing a portion of the drain electrode 175 is defined.

Reflection layers 161 and 162 are disposed on the first protection layer 151. The reflection layers 161 and 162 are disposed in each pixel. That is, the reflection layers 161 and 162 are disposed in an area overlapping the pixel electrode 191 in each pixel. The reflection layers 161 and 162 may include metal. In an exemplary embodiment, the reflection layers 161 and 162 may include aluminum (Ag) or silver (Ag), for example.

The reflection layers 161 and 162 are connected to the drain electrode 175 through the contact hole H2 defined in the passivation layer 140 and the first protection layer 151.

Color filters 181 and 182 are respectively disposed on the reflection layers 161 and 162. The color filters 181 and 182 are disposed to expose at least a portion of the reflection layers 161 and 162. In an exemplary embodiment, each of the color filters 181 and 182 may be one of a red color filter, a green color filter, and a blue color filter, for example. In an exemplary embodiment, the color filters 181 and 182 may be a white color filter, for example. However, the invention is not limited thereto, and the color filters 181 and 182 may include various other color filters.

A second protection layer 152 is disposed on the color filters 181 and 182.

A portion of the second protection layer 152 is removed such that a third contact hole H3, exposing portions of the reflection layers 161 and 162, is defined.

The pixel electrode 191 is disposed on the second protection layer 152. The pixel electrode 191 overlaps the reflection layers 161 and 162. The pixel electrode 191 is connected to the reflection layers 161 and 162 through the contact hole H3 defined in the second protection layer 152 and is electrically connected to the drain electrode 175 through the reflection layers 161 and 162. In an exemplary embodiment, the pixel electrode 191 may include a TCO such as ITO, IZO, and AZO. Referring to FIG. 2A, the pixel electrode 191 includes a cross-shaped (+) stem portion 191a extending in both transverse and longitudinal directions and a plurality of branch portions 191b extending from the stem portion 191a in a direction different from the transverse and longitudinal directions. In an exemplary embodiment, the plurality of branch portions 191b may extend in a diagonal direction, for example.

A second substrate 210 is disposed to oppose the first substrate 110, and a liquid crystal layer 300 is disposed between the first substrate 110 and the second substrate 210. A common electrode 220 is disposed on the second substrate 210. In an exemplary embodiment, a column spacer (not illustrated) which supports the first substrate 110 and the second substrate 210 may be disposed between the first substrate 110 and the second substrate 210. In an exemplary embodiment, a black matrix (not illustrated) which prevents light leakage may be disposed on at least one of the first substrate 110 and the second substrate 210.

An optical film 102 is disposed on a surface of the second substrate 210 opposite to the first substrate 110 to provide the LCD device 101B.

Figure 3:
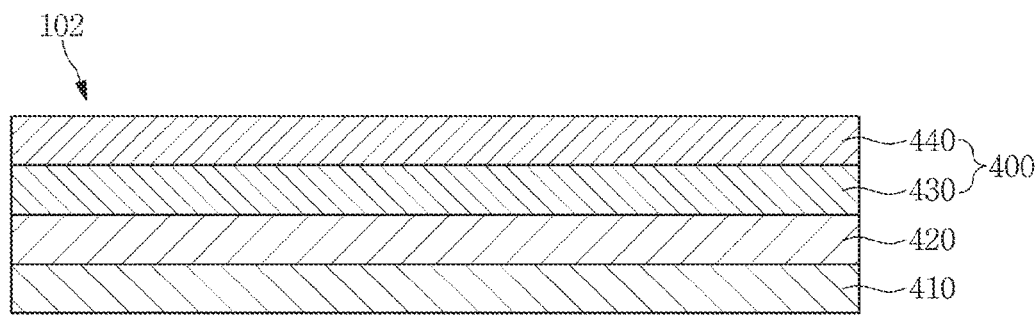
FIG. 3 is a cross-sectional view illustrating another exemplary embodiment of an optical film.

Hereinafter, another exemplary embodiment of an optical film 102 will be described with reference to FIG. 3. FIG. 3 is a cross-sectional view illustrating the second exemplary embodiment of the optical film 102.

The exemplary embodiment of the optical film 102 includes a negative (−) C-plate 410, a light diffusion layer 420 on the negative C-plate 410, and a polarizer 400 on the light diffusion layer 420. The polarizer 400 includes a linear polarizer 440 and a retardation plate 430 on the linear polarizer 440. Referring to FIG. 3, the light diffusion layer 420 is disposed between the polarizer 400 and the negative C-plate 410.

When the optical film 102 (refer to FIGS. 1B and 2B) is attached to the LCD panel 111 (refer to FIGS. 1B and 2B), the retardation plate 430 is disposed closer to the LCD panel 111 than the linear polarizer 440 is to the LCD panel.

The linear polarizer 440 linearly polarizes external light that is incident to the optical film 102.

The linear polarizer 440 may use a film that is provided by orienting dichroic dyes on a polyvinyl alcohol ("PVA")-based resin in an absorption manner. Examples of the PVA resin may include a monopolymer of vinyl acetic acid or a copolymer of vinyl acetic acid and another monomer.

The linear polarizer 440 may be manufactured through a process including uniaxially elongating a PVA resin film, dyeing the PVA resin film with a dichroic dye for the dichroic dye to be absorbed to the PVA resin film, treating the PVA resin film, to which the dichroic dye is adsorbed, using a boron aqueous solution, and washing. However, the method of manufacturing the linear polarizer 440 is not limited thereto.

A thickness of the linear polarizer 440 may vary based on a product to which the linear polarizer 440 is to be applied. In an exemplary embodiment, the linear polarizer 440 may have a thickness ranging from about 5 micrometers (μm) to about 40 μm, for example. The linear polarizer 440 may use a commercially available product.

The retardation plate 430 is disposed on a surface of the linear polarizer 440.

The retardation plate 430 retards the phase of light. The retardation plate 430 may convert linearly polarized light into circularly polarized light, or may convert circularly polarized light into linearly polarized light. In an exemplary embodiment, light externally incident to the optical film 102 may be linearly polarized by the linear polarizer 440 and circularly polarized by the retardation plate 430, for example. The circularly-polarized external light is reflected in the LCD device 101A or 101B (refer to FIGS. 1A to 2B), and then is transmitted through the optical film 102 once again to be directed outwards or fails to propagate through the optical film 102 to be dissipated.

The retardation plate 430 may have a film shape.

The retardation plate 430 according to another exemplary embodiment includes a quarter wave plate ("QWP").

The QWP may be manufactured through an elongation of a film. In an exemplary embodiment, the QWP may be manufactured by elongating a film including polycarbonate, polyvinyl alcohol, polystyrene, polymethyl methacrylate, polypropylene, polyolefin, polyarylate, or polyamide, for example.

The QWP may include a film including a cyclic olefin polymer ("COP"). In an exemplary embodiment, a norbornene-based COP may be used to provide the COP film. The COP film has high light transmittance, high thermal-resistance, and high rigidity, but has low moisture absorptivity. Further, the COP film has a relatively low price. A retardation plate including the COP film shows a phase retardation value that is relatively constant regardless of the wavelength of incident light.

In addition, the QWP may include a photocurable liquid crystal composition. In an exemplary embodiment, an alignment layer is disposed on the base film, and the liquid crystal composition is aligned on the alignment layer to be patterned, thus forming the QWP. The kind of and method of manufacturing the QWP are not particularly limited. Any suitable products that are commerciably available may be used as the QWP according to exemplary embodiments.

A light control film ("LCF") 420 is disposed on a surface of the retardation plate 430.

The LCF 420 has light directivity to control a path of external light or reflected light, and diffuses the reflected light to improve light efficiency.

Configurations and functions of the light diffusion layer 420 will be described further in detail below.

The negative C-plate 410 is disposed on the light diffusion layer 420.

The negative C-plate 410 compensates for a phase of external light that is incident to the LCD devices 101A and 101B in an inclined direction (or off axis). Herein, the inclined direction (or off axis) refers to a direction that is not parallel to a normal line of surfaces of the LCD devices 101A and 101B.

Through the phase compensation, the negative C-plate 410 removes external light reflection, which is unnecessary in a black state, such that luminance (hereinafter, "black luminance") of the LCD devices 101A and 101B may be prevented from being increased in the black state.

The negative C-plate 410 has an x-axis refractive index Nx, a y-axis refractive index Ny, and a z-axis refractive index Nz, where "Nx>Nz" and "Ny>Nz." In an exemplary embodiment, an inequation "Nx=Ny>Nz" may be satisfied. However, the invention is not limited thereto, and Nx may be different from Ny.

Configurations and functions of the negative C-plate 410 will be described further in detail below.

Figure 4:
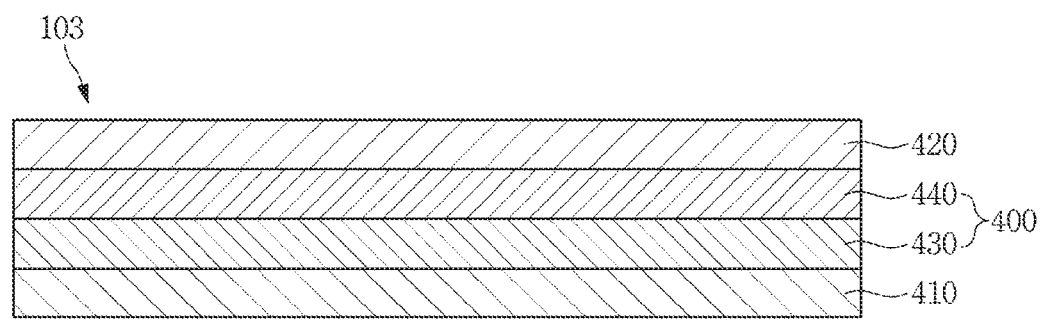
FIG. 4 is a cross-sectional view illustrating another exemplary embodiment of an optical film.

Hereinafter, an exemplary embodiment of an optical film 103 will be described with reference to FIG. 4. FIG. 4 is a cross-sectional view illustrating the exemplary embodiment of the optical film 103.

According to the exemplary embodiment, a light diffusion layer 420 is disposed on a surface of a polarizer 400, and a negative C-plate 410 is disposed on another surface of the polarizer 400. That is, the third exemplary embodiment of the optical film 103 is distinguished from the second exemplary embodiment of the optical film 102 in that in the third exemplary embodiment of the optical film 103, the light diffusion layer 420 and the negative C-plate 410 oppose each other, having the polarizer 400 therebetween. Hereinafter, to avoid repetition, descriptions of the above-described configurations will be omitted.

Figure 5:
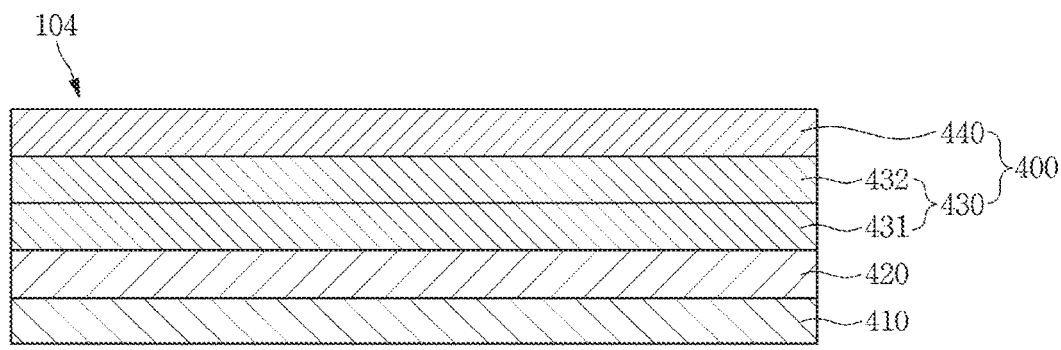
FIG. 5 is a cross-sectional view illustrating another exemplary embodiment of an optical film.

Hereinafter, a fourth exemplary embodiment of an optical film 104 will be described with reference to FIG. 5. FIG. 5 is a cross-sectional view illustrating the fourth exemplary embodiment of the optical film 104.

According to the exemplary embodiment, a retardation plate 430 includes a QWP 431 and a half wave plate ("HWP") 432.

In general, the QWP 431 is optimized to change a phase of external light that is incident perpendicular to a surface of the optical film 104. Accordingly, in the case that only the QWP 431 is used as the retardation plate 430, a phase change of the external light that is incident to a surface of the LCD device at a predetermined angle may not be desirably achieved. In order to prevent a change in phase retardation effects, which may be resulted from a light path change of external light in accordance with an incident angle of the external light, the HWP 432 is used in addition to the QWP 431.

Figure 6A:
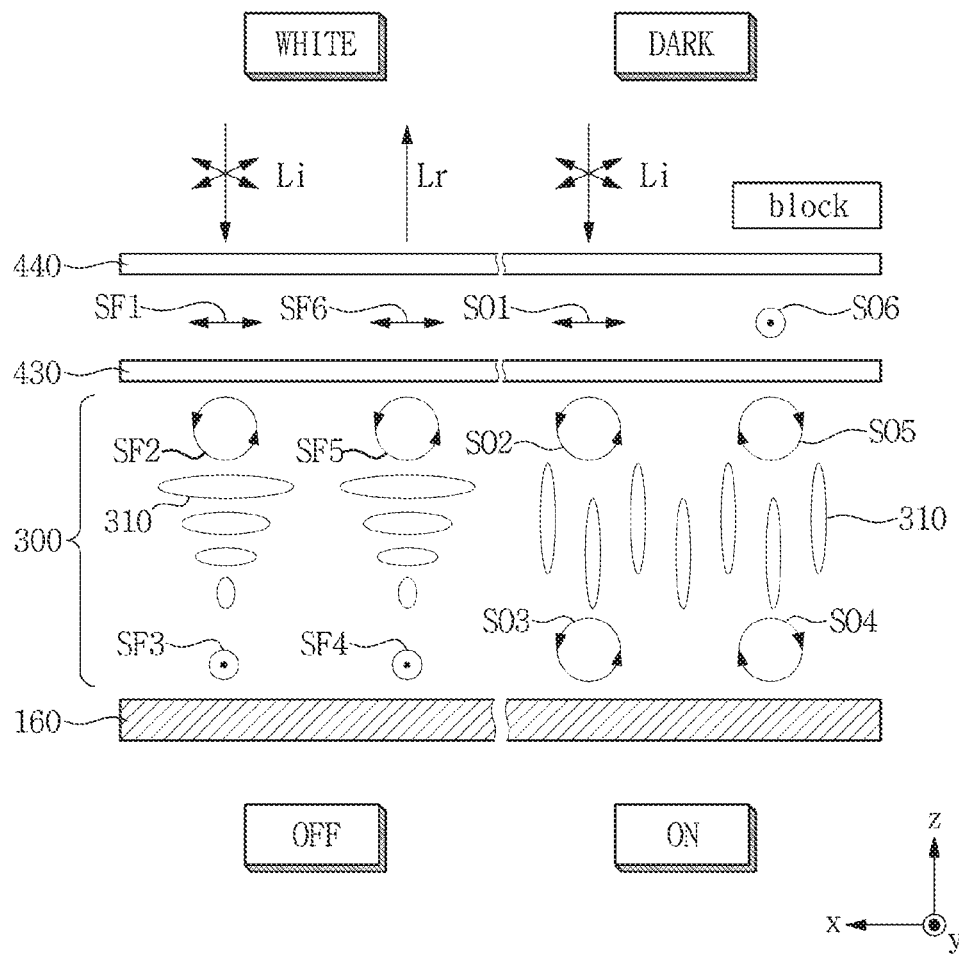
FIG. 6A is a cross-sectional view illustrating an optical operational principle of a reflective LCD device.
Figure 6B:
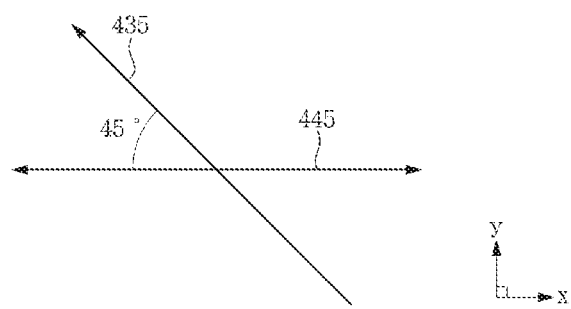
FIG. 6B illustrates an example of a relationship between a transmission axis of a linear polarizer and a slow axis of a retardation plate.

FIG. 6A is a cross-sectional view illustrating optical operational principle of a reflective LCD device, and FIG. 6B illustrates an example of a relationship between a transmission axis of a linear polarizer 440 and a slow axis of a retardation plate 430. Hereinafter, exemplary embodiments will be described with respect to the exemplary embodiment of the LCD device 101A (refer to FIGS. 1A and 1B).

In detail, FIG. 6A illustrates optical operational principle of the reflective LCD device 101A, which includes the linear polarizer 440 and the retardation plate 430 and is operated in a normal white mode.

First, a principle of displaying a white screen (e.g., left side), i.e., a bright screen, will be described.

When a propagation direction of a light Li that is externally incident to the LCD device 101A is defined as a z-axis, a left and right axis which is represented by a bidirectional arrow is defined as an x-axis, and an axis that passes through the drawing from the front to the rear, or vise versa, represented as a concentric circle (⊙), is defined as a y-axis. In addition, the light Li externally incident thereto in the z-axis direction is a light which is not polarized, vibrating on an xy-planar surface in a random manner. The light Li externally incident to the optical film through the linear polarizer 440 becomes to have a linearly polarized state SF1, only having components that vibrate parallel to the x-axis, i.e., a transmission axis, due to the linear polarizer 440.

A slow axis 435 of the retardation plate 430 is defined to have an angle of about 45 degrees (°) with respect to a transmission axis 445 of the linear polarizer 440. In an exemplary embodiment, the slow axis 435 of the retardation plate 430 and the transmission axis 445 of the linear polarizer 440 may be aligned as illustrated in FIG. 6B. Accordingly, when the light in the linearly polarized state SF1 is transmitted through the retardation plate 430, a phase difference of about 90° occurs between respective components of the slow axis 435 and the transmission axis 445. Accordingly, the light transmitted through the retardation plate 430 becomes to have a circularly polarized state SF2, revolving in a counter-clockwise direction.

Liquid crystals 310 are twisted in an area not applied with a voltage (i.e., voltage-off state), imparting a phase difference of about 90° between the x-axis and y-axis components of the light transmitted through the liquid crystal layer 300. Accordingly, the light transmitted through the liquid crystal layer 300 becomes to have a linearly polarized state SF3, only having components that vibrate in the y-axis direction.

After being reflected from the reflection layer 160, the light in the linearly polarized state SF3 in the y-axis direction becomes to have a linearly polarized state SF4, still vibrating in the y-axis direction. When the light reflected from the reflection layer 160 is transmitted through the liquid crystal layer 300 once again, a phase of the light is reversely shifted by about 90°, and the light becomes to have a circularly polarized state SF5, revolving in the counter-clockwise direction. Further, when the light is transmitted through the retardation plate 430 once again, the phase of the light is shifted by about 90°, and the light becomes to have a linearly polarized state SF6, only having components that vibrate in the x-axis.

As the transmission axis of the linear polarizer 440 is parallel to the x-axis direction, the light in the linearly polarized state SF6 in the x-axis direction is intactly transmitted through the linear polarizer 440 to provide a bright display area due to a reflected light Lr. Accordingly, in a steady state in which the voltage is not applied to the LCD panel 111, a bright screen, i.e., a white screen, is displayed.

Hereinafter, a principle of displaying a black screen, i.e., a dark screen, will be described.

When the characteristics of a light Li incident to the LCD device 101A to display the black screen is the same as those of the light Li incident to the LCD device 101A to display the white screen, the light Li incident to the optical film 102 is transmitted through the linear polarizer 440 to fall into a linearly polarized state S01, and is transmitted through the retardation plate 430 to fall into a circularly polarized state S02, revolving in the counter-clockwise direction. When a black screen is displayed, a voltage is applied to the pixel such that the liquid crystals 310 are not twisted and are parallely oriented, and the light propagating through the liquid crystal layer 300 maintains a circularly polarized state S03 without experiencing a phase change.

When the light is reflected from the reflection layer 160, the phase of the circularly polarized light is changed such that the light reflected from the reflection layer 160 becomes orthogonal with respect to the light incident to the reflection layer 160. That is, the light reflected from the reflection layer 160 becomes to have a circularly polarized state S04, revolving in a clockwise direction.

As the light in the circularly polarized state S04 does not experience a phase change while being transmitted through the liquid crystal layer 300, the light transmitted through the liquid crystal layer 300 maintains a circularly polarized state S05, revolving in the clockwise direction. The light in the circularly polarized state SOS in the clockwise direction experiences a 90° phase shift while being transmitted through the retardation plate 430 to fall into a linearly polarized state S06, only having components that vibrate in the y-axis direction. In such an exemplary embodiment, as the transmission axis of the linear polarizer 440 is parallel to the x-axis, the light in the linearly polarized state S06, only having the y-axis components, may not be transmitted through the linear polarizer 440, thus being blocked. Accordingly, as the reflected light is blocked, the pixel applied with the voltage appears dark. That is, a black screen is displayed.

Figure 7A:
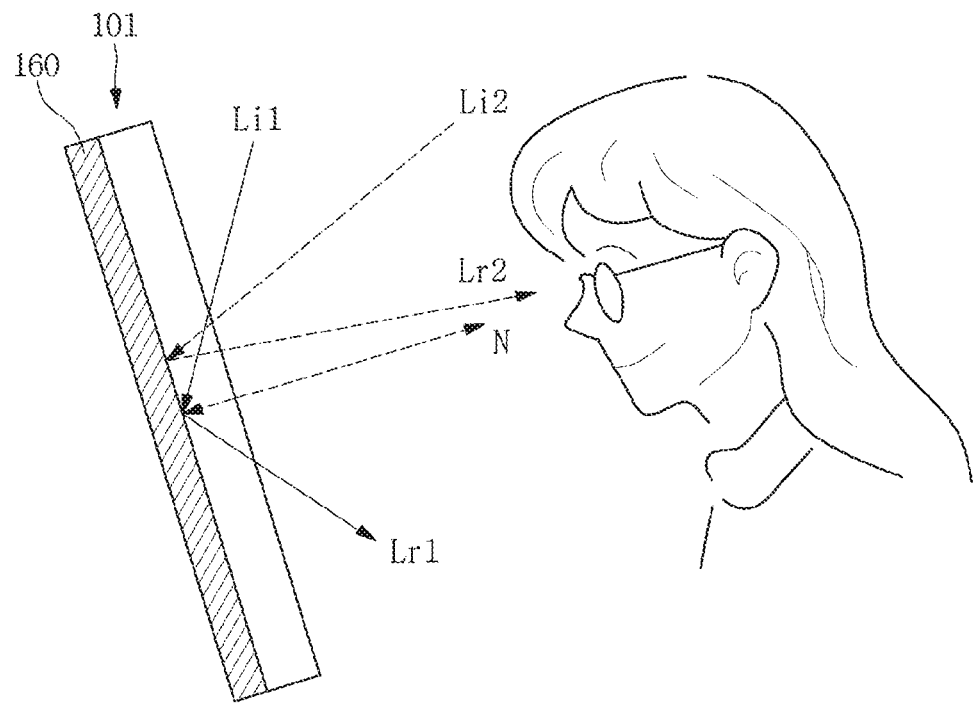
FIG. 7A is a cross-sectional view illustrating a path of light incident to the LCD device and reflected therefrom.

FIG. 7A illustrates a path of light incident to and reflected from the LCD device 101 including the LCD devices 101A and 101B (refer to FIGS. 1A to 2B).

Referring to FIG. 7A, only a light that is incident in a direction of a normal line (N) and reflected therefrom and a light Li2 that is incident in a predetermined direction and reflected from a predetermined point as a reflected light Lr2 are perceived by a user, and a reflected light Lr1, based on another incident light Li1 externally incident thereto, is not perceived by the user. Accordingly, efficiency of reflected-light utilization is relatively low.

In this regard, it is necessary to improve the efficiency of reflected-light utilization in the reflective LCD device 101A which displays an image using the reflected light, without using a backlight.

Figure 7B:
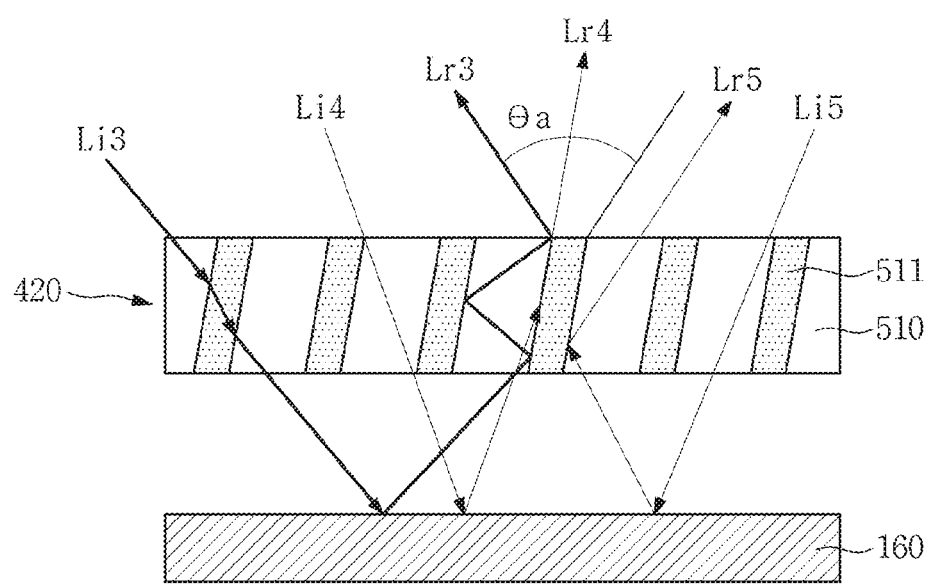
FIG. 7B illustrates a light directivity of a light diffusion layer.

FIG. 7B illustrates a light path of light transmitted through the light diffusion layer 420.

The light diffusion layer 420 illustrated in FIG. 7B includes a first light-transmissive base 510 and a plurality of first rods 511. Referring to FIG. 7B, an incident light Li3, externally incident at a relatively large angle, is reflected from the reflection layer 160 to be incident to the light diffusion layer 420, and then repeats reflection between two of the first rods 511, thus being directed outwards at an angle θa which is in a range of users' viewing angle as a reflected light Lr3.

Another incident light Li4 is reflected from the reflection layer 160 to be incident to the light diffusion layer 420, then totally reflected from an interfacial surface between the first light-transmissive base 510 and the first rod 511 to be directed outwards, as a light Lr4, at an inclination angle of the first rod 511, thus being perceived by a user.

Still another incident light Li5 is reflected from the reflection layer 160 to be incident to the light diffusion layer 420, and then is reflected from the first rod 511 to be directed outwards, as a light Lr5, substantially parallel to the incident light Li5.

Due to the light diffusion layer 420, the path of reflected light is guided in a viewing angle direction of the user such that efficiency of the reflected light is improved. The light diffusion layer 420 according to exemplary embodiments has a function to control the light path, and thus is also referred to as an LCF.

Figure 8A:
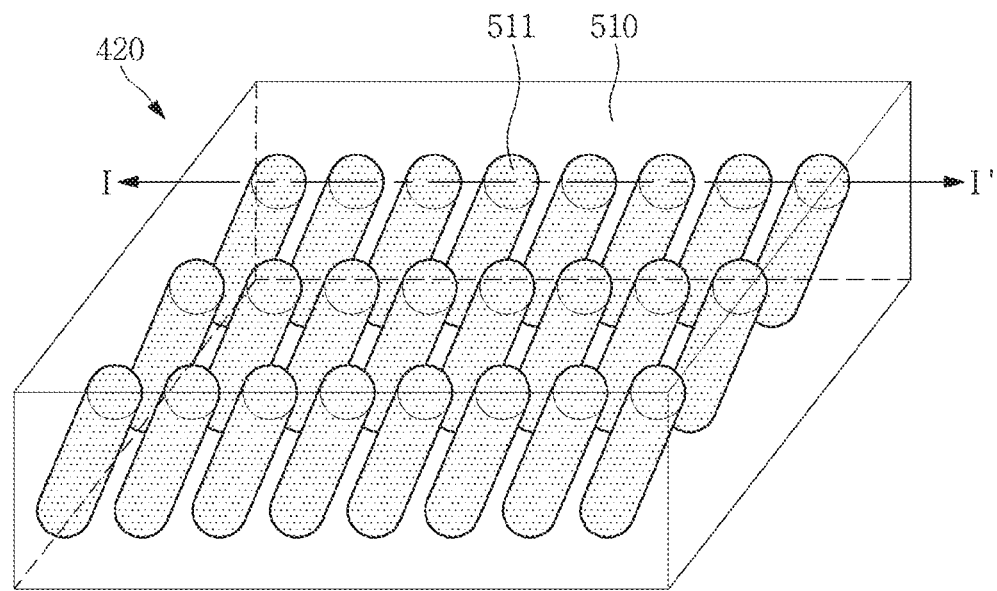
FIG. 8A is a perspective view illustrating an exemplary embodiment of a light diffusion layer.
Figure 8B:
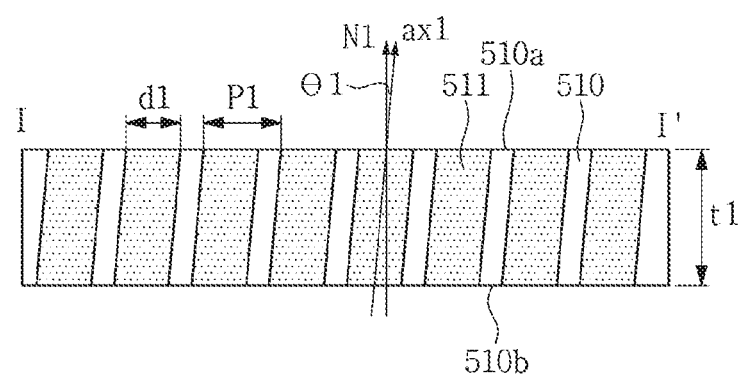
FIG. 8B is a cross-sectional view taken along line I-I' of FIG. 8A.

FIG. 8A is a perspective view illustrating an exemplary embodiment of the light diffusion layer 420, and FIG. 8B is a cross-sectional view taken along line I-I' of FIG. 8A.

The light diffusion layer 420 illustrated in FIGS. 8A and 8B includes a first light-transmissive base 510 and a plurality of first rods 511 that have a different refractive index from a refractive index of the first light-transmissive base 510 and are aligned at a first inclination angle θ1 in the first light-transmissive base 510. The first light-transmissive base 510 has a film shape, and the light diffusion layer 420 has a film shape in accordance therewith.

The first rod 511 has a rod shape or a pillar shape. In an exemplary embodiment, the first rod 511 may have a circular pillar shape, e.g., a cylinder shape, or an angled pillar shape, e.g., a prism shape. However, the invention is not limited thereto, and the first rod 511 may include various other shapes.

The first inclination angle θ1, an alignment direction of the first rod 511, is defined as an angle of a major axis ax1 of the first rod 511 with respect to a normal line N1 of the first light-transmissive base 510.

In an exemplary embodiment, the first rod 511 has the first inclination angle θ1 ranging from about 0° to about 5°, for example.

The first rod 511 guides light to propagate at the first inclination angle θ1. Accordingly, the light diffusion layer 420 has light directivity.

In addition, since the first rod 511 has the different refractive index from that of the first light-transmissive base 510, the light incident to the light diffusion layer 420 may be scattered at the first rod 511. Accordingly, the light diffusion layer 420 has light scattering characteristics.

In the case that a refractive-index difference between the first light-transmissive base 510 and the first rod 511 is substantially small, the light scattering characteristics of the light diffusion layer 420 is degraded. In the case that the refractive-index difference therebetween is substantially large, lights of a wide range of incidence angles are scattered such that light directivity of the light diffusion layer 420 is degraded. Accordingly, in consideration of the light directivity and light scattering characteristics of the light diffusion layer 420, the refractive-index difference between the first light-transmissive base 510 and the first rod 511 may be selected in a range of about 0.001 to about 0.5. In an exemplary embodiment, the refractive-index difference between the first light-transmissive base 510 and the first rod 511 may be in a range of about 0.001 to about 0.4, for example.

In an exemplary embodiment, the first light-transmissive base 510 may have the refractive index ranging from about 1.4 to about 1.6, and the first rod 511 may have the refractive index ranging from about 1.45 to about 2.1, for example.

In an exemplary embodiment, the first light-transmissive base 510 may have a thickness t1 ranging from about 100 μm to about 200 μm, for example. In the case that the thickness t1 of the first light-transmissive base 510 is less than about 100 μm, the light diffusion layer 420 may not achieve stable mechanical characteristics, the forming of the first rod 511 may become relatively difficult, and the first rod 511 may not readily achieve light directivity. In the case that the thickness of the first light-transmissive base 510 is greater than about 200 μm, flexibility of the light diffusion layer 420 is degraded and a device including the light diffusion layer 420 may not easily achieve slimness.

The thickness t1 of the first light-transmissive base 510 is one of factors that determine a length of the first rod 511.

Referring to FIG. 8B, the plurality of first rods 511 extend from a surface 510a of the first light transmissive base 510 to another surface 510b of the first light transmissive base 510 opposite to the surface 510a. A length of the first rod 511 along its major axis ax1 is greater than or equal to the thickness t1 of the first light-transmissive base 510. In an exemplary embodiment, the plurality of first rods 511 may each have a length ranging from about 100 μm to about 200 μm, for example.

In an exemplary embodiment, the first rod 511 has a diameter d1 ranging from about 1 μm to about 3 μm, and the plurality of first rods 511 are spaced apart from one another at an interval ranging from about 1 μm to about 2 μm, for example.

In an exemplary embodiment, a disposition interval of the plurality of first rods 511, that is a pitch P1 including the diameter d1 and the interval between two adjacent ones of the first rods 511, is in a range of about 3.5 μm to about 4.5 μm, for example.

The first light-transmissive base 510 includes a light-transmissive resin. In an exemplary embodiment, the first light-transmissive base 510 may include at least one of a polyester-based resin, an acrylic resin, a cellulose resin, a polyolefin resin, a polyvinyl chloride-based resin, a polycarbonate-based resin, a phenolic resin and a urethane resin, for example.

The first rod 511 may include or consist of different materials from that included in the first light-transmissive base 510.

In an exemplary embodiment, the first rod 511 and the first light-transmissive base 510 may include or consist of the same photopolymerizable composition, for example. The photopolymerizable composition is irradiated to light and cured in a selective manner such that the first light-transmissive base 510 and the first rod 511 may be provided.

Figure 9A:
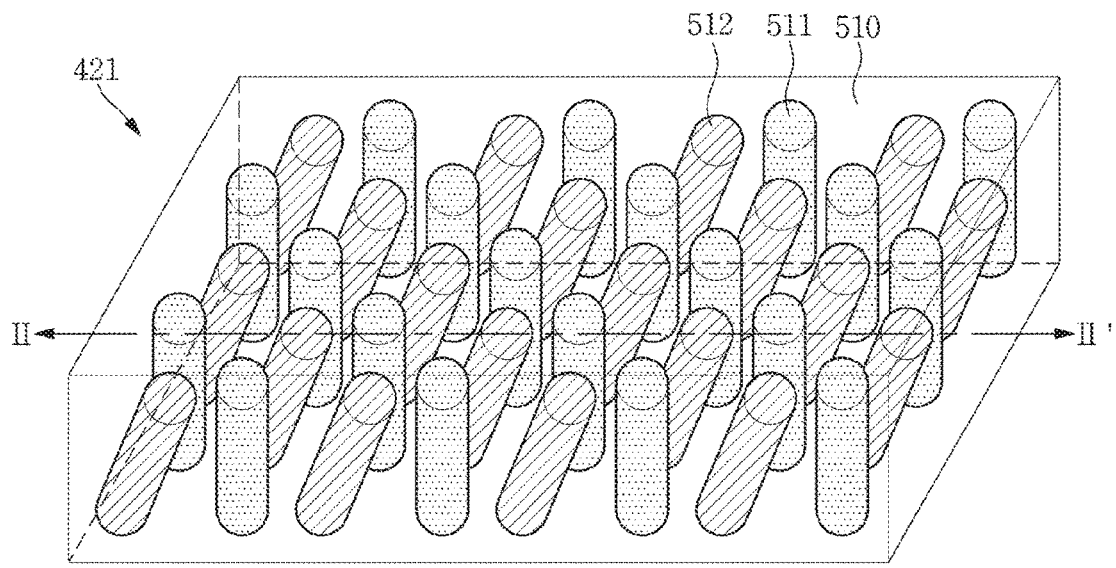
FIG. 9A is a perspective view illustrating an alternative exemplary embodiment of a light diffusion layer.
Figure 9B:
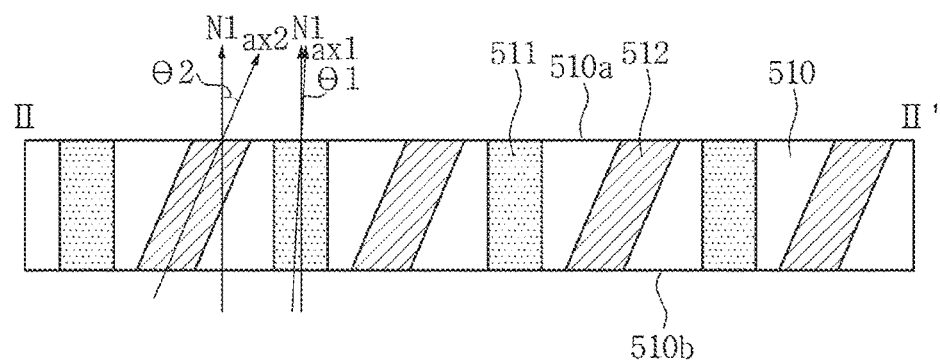
FIG. 9B is a cross-sectional view taken along line II-II' of FIG. 9A.

FIG. 9A is a perspective view illustrating an alternative exemplary embodiment of a light diffusion layer 421, and FIG. 9B is a cross-sectional view taken along line II-II' of FIG. 9A.

The light diffusion layer 421 illustrated in FIGS. 9A and 9B includes a first light-transmissive base 510, a plurality of first rods 511, and a plurality of second rods 512 that have a different refractive index from a refractive index of the first light-transmissive base 510 and are aligned at a second inclination angle θ2 with reference to the normal line N1 in the first light-transmissive base 510.

Referring to FIGS. 9A and 9B, the plurality of first rods 511 and the plurality of second rods 512 are alternately disposed along a transverse direction of the drawings. In addition, the plurality of first rods 511 and the plurality of second rods 512 are alternately disposed along a longitudinal direction of the drawings.

An optical film 102 including the plurality of first rods 511 and the plurality of second rods 512, which are arranged regularly, has excellent light directivity and light diffusion characteristics.

The plurality of second rods 512, similar to the first rod 511, may each have a rod shape or a pillar shape. In an exemplary embodiment, the second rod 512 may have a circular pillar shape, e.g., a cylinder shape, or an angled pillar shape, e.g., a prism shape. However, the invention is not limited thereto, and the second rod 512 may include various other shapes.

The second rods 512 are aligned in a predetermined direction at a second inclination angle θ2 in the first light-transmissive base 510. The second inclination angle θ2 is defined as a major axis ax2 of the second rod 512 with respect to a normal line N1 of the first light-transmissive base 510.

The second rod 512 has a different inclination angle from an inclination angle of the first rod 511. That is, the first inclination angle θ1 and the second inclination angle θ2 have different values (θ1≠θ2). In an exemplary embodiment, the second rod 512 has the second inclination angle θ2 ranging from about 5° to about 20°, for example.

The first rod 511 induces light propagation at the first inclination angle θ1, and the second rod 512 includes light propagation at the second inclination angle θ2. Accordingly, the light diffusion layer 421 illustrated in FIGS. 9A and 9B has bidirectional light directivity.

In an exemplary embodiment, as the first rod 511 and the second rod 512 have different refractive indices from a refractive index of the first light-transmissive base 510, light incident to the light diffusion layer 420 may be scattered at the first rod 511 and the second rod 512. Accordingly, the light diffusion layer 420 may have light scattering characteristics.

The first rod 511 and the second rod 512 may have the same refractive index with each other or may have different refractive indices from each other.

The refractive-index difference between the light-transmissive base 510 and the second rod 512 may be selected in a range of about 0.001 to about 0.5. In an exemplary embodiment, the refractive-index difference between the first light-transmissive base 510 and the second rod 512 may be in a range of about 0.001 to about 0.04, for example.

In an exemplary embodiment, the second rod 512 may have a refractive index in a range of about 1.45 to about 2.1, for example.

In an exemplary embodiment, the first rods 511 and the second rods 512 may be spaced apart from each other at a distance ranging from about 1 μm to about 2 μm along the transverse direction of the drawings, for example, but the invention is not limited thereto.

The first rod 511 and the second rod 512 may include the same material. In addition, the second rod 512 may include the same material as a material included in the first light-transmissive base 510. In an exemplary embodiment, the first rod 511, the second rod 512, and the first light-transmissive base 510 may include or consist of the same photopolymerizable composition, for example. The photopolymerizable composition is irradiated to light and cured in a selective manner such that the first rod 511 and the second rod 512, which are dissimilar to first light-transmissive base 510, may be provided.

Figure 10:
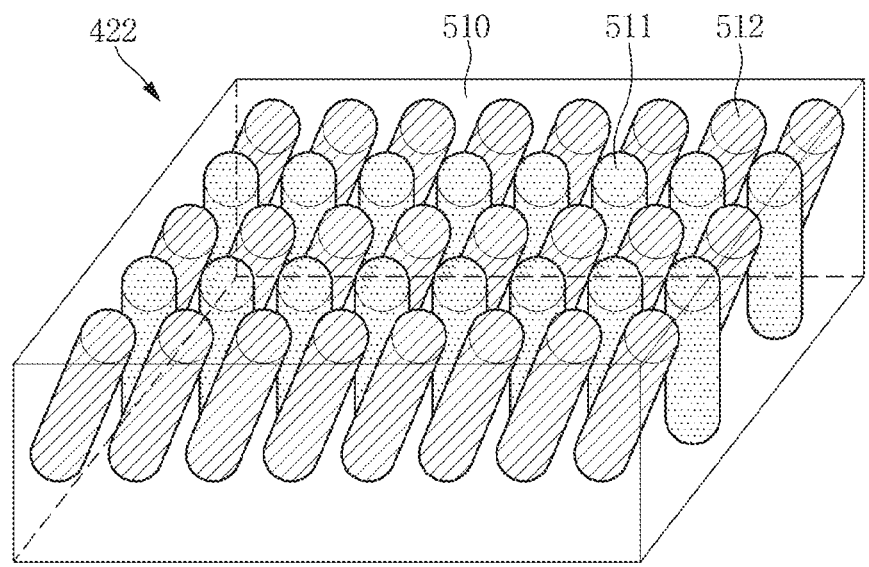
FIG. 10 is a perspective view illustrating an alternative exemplary embodiment of a light diffusion layer.

FIG. 10 is a perspective view illustrating another alternative exemplary embodiment of a light diffusion layer 422.

Referring to FIG. 10, a plurality of first rods 511 is disposed in a first line (e.g., a first row) along one direction, and a plurality of second rods 512 is disposed in a second line (e.g., a second row) adjacent to and parallel to the first line along which the plurality of first rods 511 is disposed. Referring to FIG. 10, the plurality of first rods 511 and the plurality of second rods 512 are disposed parallel to one another along a transverse direction (e.g., horizontal direction) of the drawings. In addition, the plurality of first rods 511 and the plurality of second rods 512 are disposed in an alternate manner along a longitudinal direction of the drawings.

Figure 11:
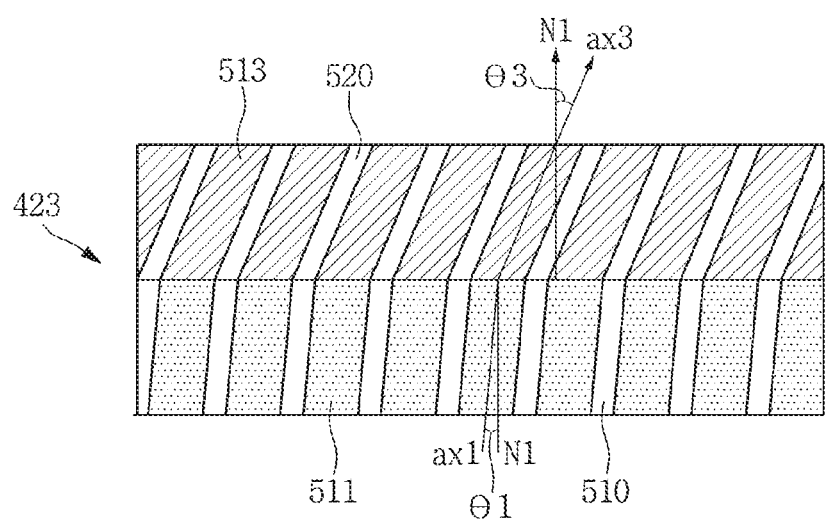
FIG. 11 is a cross-sectional view illustrating an alternative exemplary embodiment of a light diffusion layer.

FIG. 11 is a cross-sectional view illustrating another alternative exemplary embodiment of a light diffusion layer 423.

The light diffusion layer 423 of FIG. 11 includes a first light-transmissive base 510 and a plurality of first rods 511 that have a different refractive index from a refractive index of the first light-transmissive base 510 and are aligned at a first inclination angle θ1 in the first light-transmissive base 510, and further includes a second light-transmissive base 520, on the first light-transmissive base 510, and a plurality of third rods 513 that have a different refractive index from a refractive index of the second light-transmissive base 520 and are aligned at a third inclination angle θ3 with reference to the normal line N1 in the second light-transmissive base 520.

The plurality of third rods 513 may each have a rod shape or a pillar shape. In an exemplary embodiment, the third rod 513 may have a circular pillar shape, e.g., a cylinder shape, or an angled pillar shape, e.g., a prism shape. However, the invention is not limited thereto, and the third rod 513 may include various other shapes.

The third rods 513 are aligned in a predetermined direction at the third inclination angle θ3 in the second light-transmissive base 520. The third inclination angle θ3 is defined as an angle of a major axis ax3 of the third rod 513 with respect to a normal line N1 of the second light-transmissive base 520.

The normal line N1 of the second light-transmissive base 520 corresponds to the normal line N1 of the first light-transmissive base 510. The second light-transmissive base 520 may include the same material as a material included in the first light-transmissive base 510.

In addition, the third rod 513 may have the same structure as that of the second rod 512. In an exemplary embodiment, the third rod 513 may have the third inclination angle θ3 ranging from about 5° to about 20°, for example.

Figure 12:
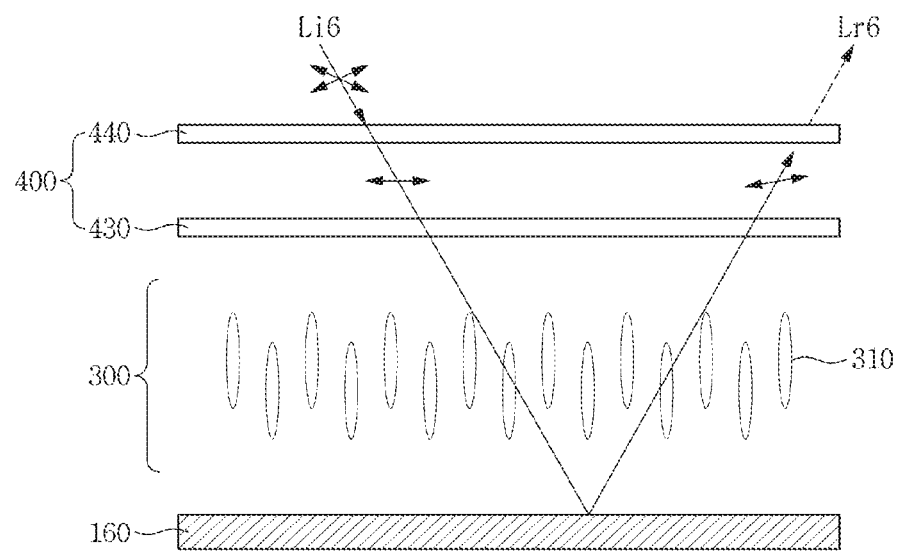
FIG. 12 is a cross-sectional view illustrating reflection of an incident light externally incident through a side surface.

FIG. 12 is a cross-sectional view illustrating reflection of an incident light Li6 externally incident through a side surface.

When the reflective LCD device, operated in a normal white mode, displays a black screen, which is a dark screen, voltage is applied to the LCD panel such that the liquid crystals 310 are parallelly aligned. Accordingly, light that perpendicularly propagates through the liquid crystal layer 300 does not experience phase variation.

However, the incident light Li6 externally incident through the side surface and a reflected light Lr6 of the incident light Li6 are not parallel to the liquid crystals 310. Accordingly, a phase of the reflected light Lr6 is changed when the reflected light Lr6 propagates through the liquid crystal layer 300, and thus the reflected light Lr6 is not completely blocked by the retardation plate 430 and the linear polarizer 440. Accordingly, the luminance (e.g., black luminance) of the black screen increases such that the dark screen is displayed improperly.

In addition, in the case where the light reflected from one of the pixels is not completely blocked, it affects adjacent ones of the pixels, thus resulting in a black luminance increase in the adjacent ones of the pixels. Accordingly, an undesired color may be displayed in the adjacent ones of the pixels.

Figure 13:
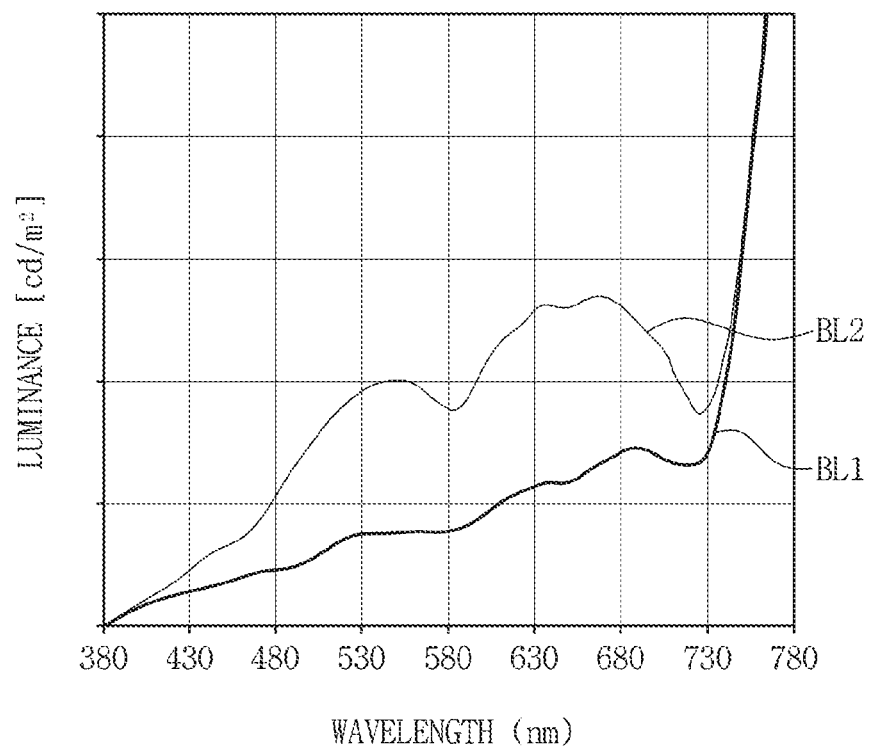
FIG. 13 is a black luminance spectrum according to a wavelength.

FIG. 13 is a black luminance spectrum according to a wavelength.

The graph illustrated in FIG. 13 illustrates reflection of a light externally incident at an angle of about 30° with respect to a normal line of a surface of an LCD device, which is observed from the front side (the normal line direction) of the LCD device. In FIG. 13, a black luminance BL1 refers to a black luminance of an LCD panel not including liquid crystals 310, and a black luminance BL2 refers to a black luminance of the LCD panel including the liquid crystals 310. Herein, the LCD device includes a color filter having a thickness of about 1.5 µm, for example.

Referring to the black luminance BL1 illustrated in FIG. 13, the LCD panel has a predetermined luminance in the black state due to light externally incident through the side surface.

In an exemplary embodiment, in the case of the black luminance BL2 of the LCD panel including the liquid crystals 310 (refer to FIG. 12), the light externally incident through the side surface is not parallel to the liquid crystals 310 such that a phase of reflected light is changed. Accordingly, as compared to the black luminance BL1 of the LCD panel not including the liquid crystals 310, the black luminance BL2 of the LCD panel including the liquid crystals 310 further increases.

As the black luminance increases, a brightness difference between a bright state and a dark state becomes relatively smaller, and thus a contrast ratio decreases.

The contrast ratio refers to a ratio between a highest brightness (i.e., white) and a lowest brightness (i.e., black) that the display device can represent. As the contrast ratio increases, a detailed and dense image may be displayed when displaying not only a bright screen but also a dark screen. In this regard, in the case that the reflected light generated by the light incident through the side surface is not removed, a luminance of the lowest brightness (i.e., black) increases, thus resulting in a decrease in the contrast ratio represented by the display device. In the reflective LCD device, which is configured so that the reflected light, generated by the light incident through the side surface, is not removed may have a relatively low contrast ratio of about 5.3:1, for example.

Figure 14:
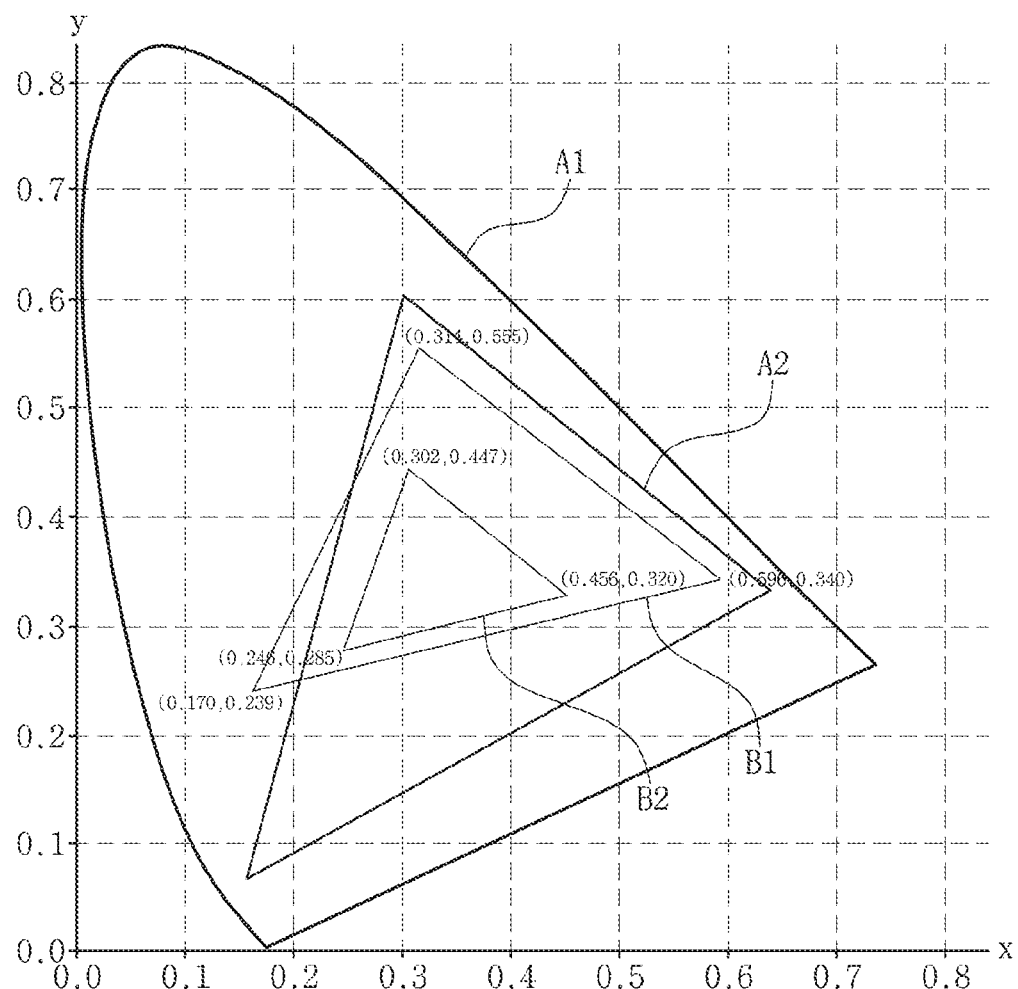
FIG. 14 is a color reproduction diagram.

FIG. 14 is a color reproduction diagram.

In detail, FIG. 14 illustrates a color reproduction diagram in CIE 1931 chromaticity coordinates. In FIG. 14, an area A1 represents a color range recognized by a human being and an area A2 represents a color range desired in high-definition television ("HDTV").

In FIG. 14, an area B1 represents a color range displayed on a reflective LCD device in which a factor of increasing black luminance based on light incident through the side surface is not taken into account, and an area B2 represents a color range displayed on the reflective LCD device in which the factor of increasing black luminance based on light incident through the side surface is taken into account.

The chromaticity coordinates of red, green, and blue colors are described in the following Table 1 in detail. In Table 1, an item "black luminance included" shows chromaticity coordinates (Rx, Ry) of a red color, chromaticity coordinates (Gx, Gy) of a green color, and chromaticity coordinates (Bx, By) of a blue color that are displayed on the reflective LCD device in which the factor of increasing the black luminance based on the light incident through the side surface is taken into account. In addition, an item "black luminance removed" shows chromaticity coordinates of colors that are displayed on the reflective LCD device in which the factor of increasing the black luminance based on the light incident through the side surface is not taken into account. In detail, the chromaticity coordinates of the item "black luminance removed" may be obtained based on the chromaticity coordinates (Rx, Ry) of a red color displayed on the reflective LCD device displaying only the red color, the chromaticity coordinates (Gx, Gy) of a green color displayed on the reflective LCD device displaying only the green color, and the chromaticity coordinates (Bx, By) of a blue color displayed on the reflective LCD device displaying only the blue color.

A gamut ratio represents a ratio of a range (e.g., area) of color displayed on the display device to the range A1 of color recognized by human beings. The gamut ratio in percent (%) ratio is referred to as color reproducibility.

TABLE 1

|  | Black Luminance Included | Black Luminance Removed |
|---|---|---|
| Rx | 0.456 | 0.596 |
| Ry | 0.320 | 0.340 |
| Gx | 0.302 | 0.314 |
| Gy | 0.447 | 0.555 |
| Bx | 0.246 | 0.170 |
| By | 0.285 | 0.239 |
| Gamut ratio | 10.1% | 39.2% |

Referring to FIG. 14 and Table 1, the reflective LCD device that has the factor of increasing the black luminance based on the light incident through the side surface has a gamut ratio of about 10.1% and thereby has a significantly low capability for color representation. As such, the reflective LCD device configured so that reflected light of the light incident through the side surface is not removed has a low color reproducibility.

According to the first exemplary embodiment, in the case of displaying a dark screen (e.g., black), the negative C-plate 410 (refer to FIGS. 3 to 5) is utilized so that the black luminance of the reflective LCD device 101A is decreased and the color reproducibility thereof is improved by removing the reflected light of the light incident through the side surface.

The liquid crystals 310 (refer to FIGS. 1B and 2B) applied to the LCD device in a vertically aligned ("VA") mode are vertically tilted in a black (or dark) state, for example. In order to compensate for phases of external light transmitted through the liquid crystals 310 and reflected light of the external light, a negative C-plate 410 which satisfies "Nx>Nz" and "Ny>Nz" is used.

According to the first exemplary embodiment, the negative C-plate 410 may have a surface-direction phase retardation value (Re) ranging from about 0 nanometer (nm) to about 5 nm. The surface-direction phase retardation value (Re) is obtained by a following Equation 1.

$$Re=|Nx-Ny|\times d \quad \text{[Equation 1]}$$

In the Equation 1, "d" refers to a thickness of the negative C-plate 410.

Further, in the Equation 1, "Nx" and "Ny" may have the same value. That is, the negative C-plate 410 in which "Nx=Ny" and "the surface-direction phase retardation value (Re) is 0" may be used.

In an exemplary embodiment, as satisfying "Nx=Ny" or "Nx≈Ny (i.e., Nx is substantially equal to Ny)," the negative C-plate 410 may not have photoanisotropy with respect to light propagating in a z-axis direction. Accordingly, in the case that a viewer views the reflective LCD device 101A (refer to FIGS. 1A and 1B) in the z-axis direction, i.e., from the front side, the view may not be limited by the negative C-plate 410.

In addition, when the LCD device 101A displays a dark screen (e.g., black screen), the negative C-plate 410 has a thickness-direction phase retardation value Rth in order to compensate for a phase change, due to the liquid crystal layer 300 (refer to FIGS. 1B and 2B), of light externally incident in an inclined direction, In general, the liquid crystal layer 300 is designed to have a phase value of about a fourth of the central wavelength of the visible light (i.e., λ=550 nm). In theory, the liquid crystal layer 300 may be designed to have a phase value of about 137.5 nm, but in consideration of a process error and/or an operational error, the liquid crystal layer 300 may be designed to have a phase value ranging from about 112.5 nm to about 162 nm. In addition, a non-operating area (anchoring force) may substantially occur in the LCD device even though a voltage is applied to the LCD device, and thus when further considering the non-operating area, the liquid crystal layer 300 may have the phase value ranging from about 142.5 nm to about 192 nm.

In consideration of the phase value of the liquid crystal layer 300, the negative C plate 410 may be designed to have a thickness-direction phase retardation value Rth ranging from about 142.5 nm to about 192 nm. In consideration of the operational characteristics, the negative C plate 410 may be designed to have the thickness-direction phase retardation value Rth ranging from about 142.5 nm to about 232.5 nm.

The thickness-direction phase retardation value Rth may be obtained by the following Equation 2.

$$Rth=|(Nx+Ny)/2-Nz|\times d \quad \text{[Equation 2]}$$

In Equation 2, "d" represents a thickness of the negative C-plate 410.

In an exemplary embodiment, the negative C-plate 410 may have the thickness-direction phase retardation value Rth ranging from about 180 nm to about 220 nm, for example.

In an exemplary embodiment, the negative C-plate 410 may have a thickness ranging from about 1 μm to about 30 μm, for example. Based on a material and purpose of use of the negative C-plate 410, the thickness of the negative C-plate 410 may vary.

In an exemplary embodiment, the negative C-plate 410 may include a discotic compound, and may have a film shape.

In an exemplary embodiment, the negative C-plate 410 may include at least one of polyarylate, polynorbornene, polycarbonate, polysulfone, polyimide, cellulose and derivatives thereof, for example.

Hereinafter, optical properties of the first exemplary embodiment of the LCD device 101A will be described.

FIGS. 15, 16A, 17A, and 18A represent reflectances of a white pixel, a red pixel, a green pixel, and a blue pixel, respectively, in a bright (e.g., white) state.

Hereinafter, an experimental result with respect to an LCD device including a negative C-plate having a surface-direction phase retardation value Re of about 0 and a thickness-direction phase retardation value Rth of about 180 nm is denoted as "Ex. 1," an experimental result with respect to an LCD device including a negative C-plate having a surface-direction phase retardation value Re of about 0 and a thickness-direction phase retardation value Rth of about 220 nm is denoted as "Ex. 2," and an experimental result with respect to an LCD device not including the negative C-plate is denoted as "Comp. 1."

In detail, FIGS. 15, 16A, 17A, and 18A are graphs illustrating reflectance measurement results using a reflective LCD panel including a liquid crystal layer having a thickness, a cell gap, of about 1.6 μm. The reflectance is represented in a relative brightness ratio with respect to a brightness of light reflected from barium sulfate (BaSO₄), when light having the same intensity is externally incident.

Figure 15:
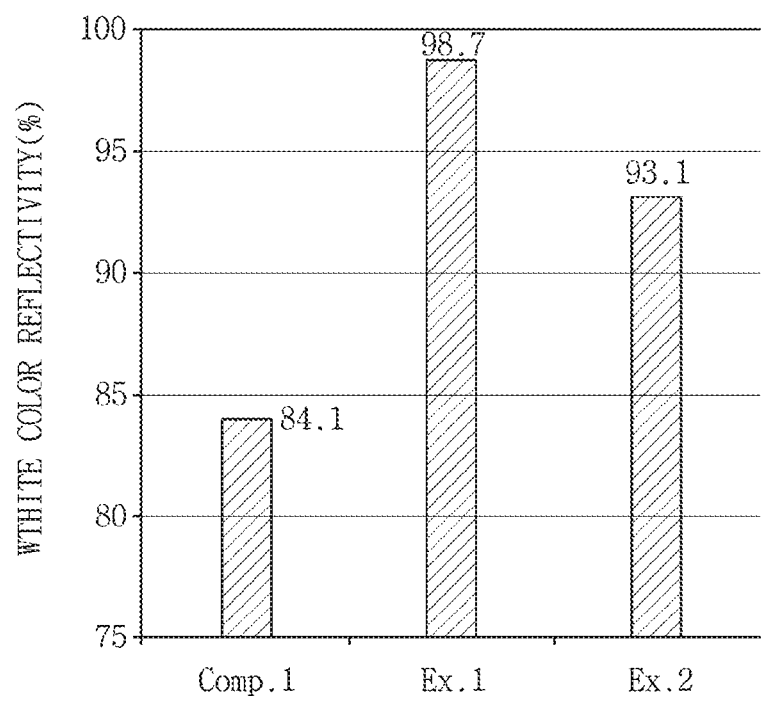
FIG. 15 is a graph illustrating reflectance of a white pixel.

FIG. 15 is a graph illustrating reflectance of a white pixel.

Referring to FIG. 15, when displaying a white color (i.e., gray level 255), reflectances of the LCD devices (i.e., Ex. 1 and Ex. 2) including the negative C-plates are higher than that of the LCD (i.e., Comp. 1) not including the negative C-plate. Accordingly, the LCD devices (i.e., Ex. 1 and Ex. 2) including the negative C-plates have higher luminance than that of the LCD device (i.e., Comp. 1) not including the negative C-plate, and thus possess better color representation capability.

Figure 16A:
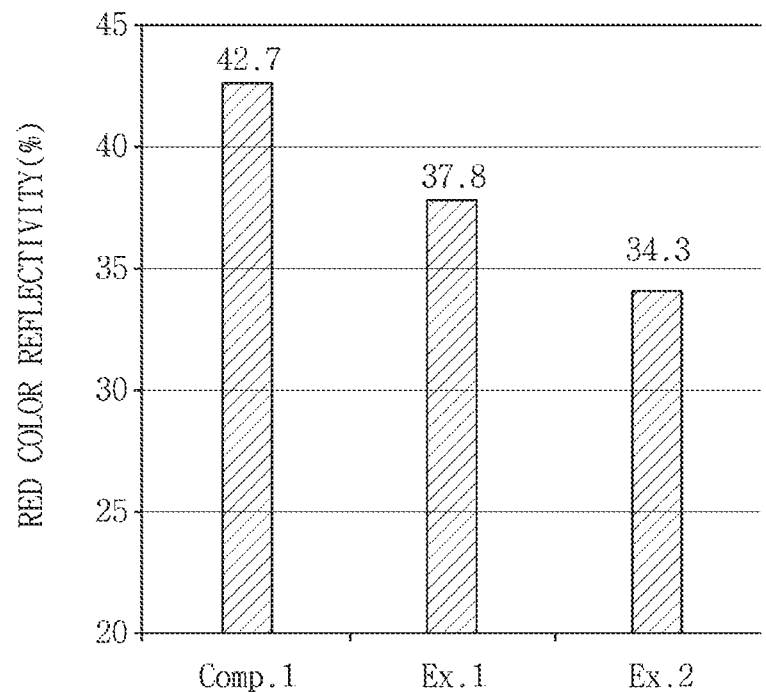
FIG. 16A is a graph illustrating reflectance of a red pixel.
Figure 16B:
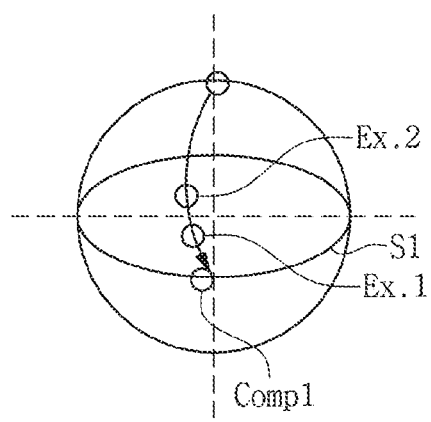
FIG. 16B illustrates a path of a red light on the Poincare sphere.

FIG. 16A is a graph illustrating reflectance of a red pixel, and FIG. 16B illustrates a path of a red light on the Poincare sphere.

Referring to FIG. 16A, in a bright state (e.g., gray level 255), the LCD device (i.e., Comp. 1) not including the negative C-plate has a higher red pixel reflectance than a red pixel reflectance of the LCD devices (i.e., Ex. 1 and Ex. 2) including the negative C-plates. However, the difference therebetween is not significantly large. The result may be attributed to the negative C-plate that is designed to be optimized to the central wavelength of the visible light (i.e., λ=550 nm).

Referring to FIG. 16B, a red color displayed on the LCD device (i.e., Comp. 1) not including the negative C-plate is linearly polarized to be positioned on an equatorial plane S1 of the Poincare sphere. A red color displayed on the LCD devices (i.e., Ex. 1 and Ex. 2) including the negative C-plates is positioned upwardly of the equatorial plane S1 of the Poincare sphere.

Figure 17A:
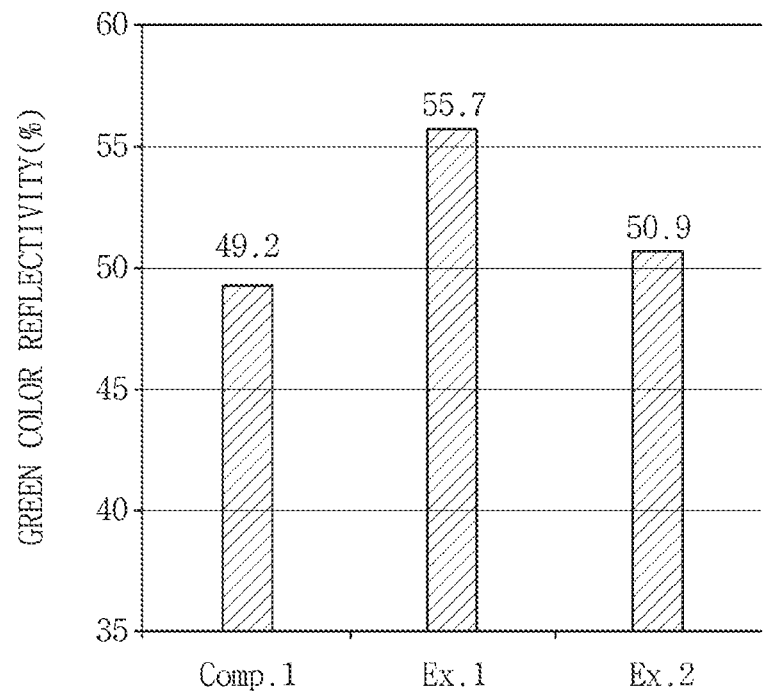
FIG. 17A is a graph illustrating reflectance of a green pixel and FIG. 17B illustrates a path of a green light on the Poincare sphere.
Figure 17B:
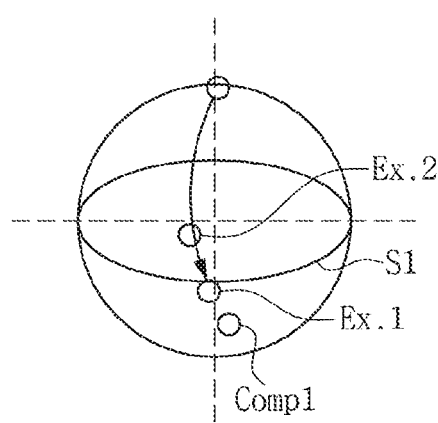

FIG. 17A is a graph illustrating reflectance of a green pixel and FIG. 17B illustrates a path of a green light on the Poincare sphere.

Referring to FIG. 17A, in a bright state (e.g., gray level 255), the LCD devices (i.e., Ex. 1 and Ex. 2) including the negative C-plates have a higher green pixel reflectance than a green pixel reflectance of the LCD device (i.e., Comp. 1) not including the negative C-plate. As such, when the reflectance is relatively high in the bright state (e.g., gray level 255), an excellent color having a high luminance may be represented.

Further, referring to FIG. 17B, a green color displayed on the LCD device (i.e., Ex. 1) including the negative C-plate having a phase retardation value Rth of about 180 nm is linearly polarized to be positioned on the equatorial plane S1 of the Poincare sphere.

Figure 18A:
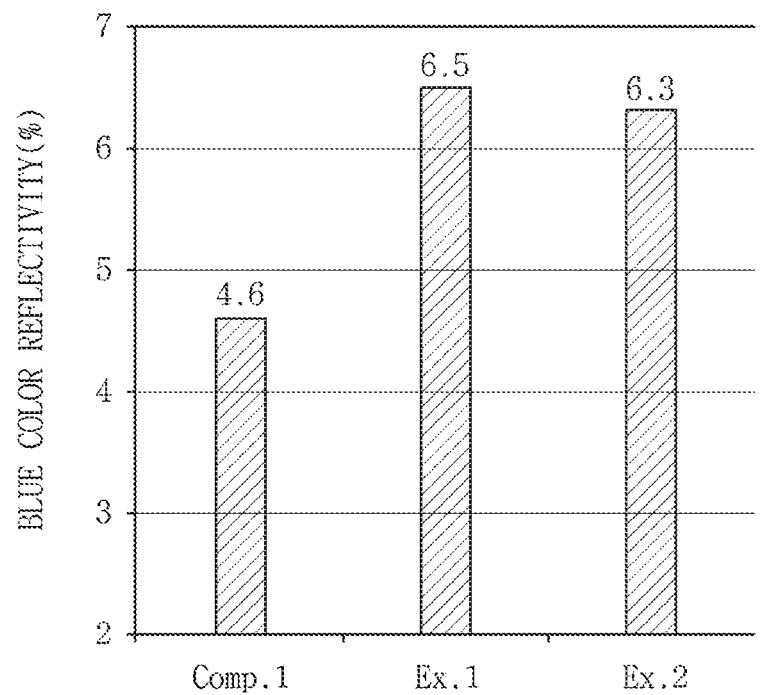
FIG. 18A is a graph illustrating reflectance of a blue pixel and FIG. 18B illustrates a path of a blue light on the Poincare sphere.
Figure 18B:
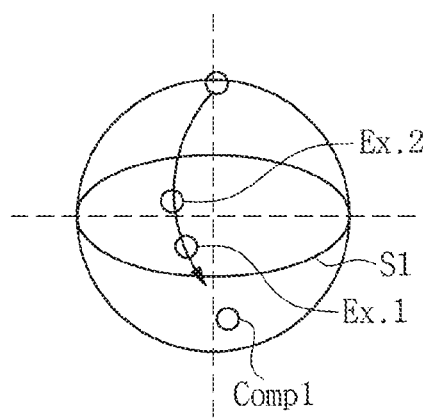

FIG. 18A is a graph illustrating reflectance of a blue pixel and FIG. 18B illustrates a path of a blue light on the Poincare sphere.

Referring to FIG. 18A, in a bright state (e.g., gray level 255), the LCD devices (i.e., Ex. 1 and Ex. 2) including the negative C-plates have a higher blue pixel reflectance than a blue pixel reflectance of the LCD device (i.e., Comp. 1) not including the negative C-plate.

Further, referring to FIG. 18B, a blue color displayed on the LCD device (i.e., Ex. 1) including the negative C-plate having a phase retardation value Rth of about 180 nm is substantially linearly polarized to be positioned substantially on the equatorial plane S1 of the Poincare sphere.

Figure 19A:
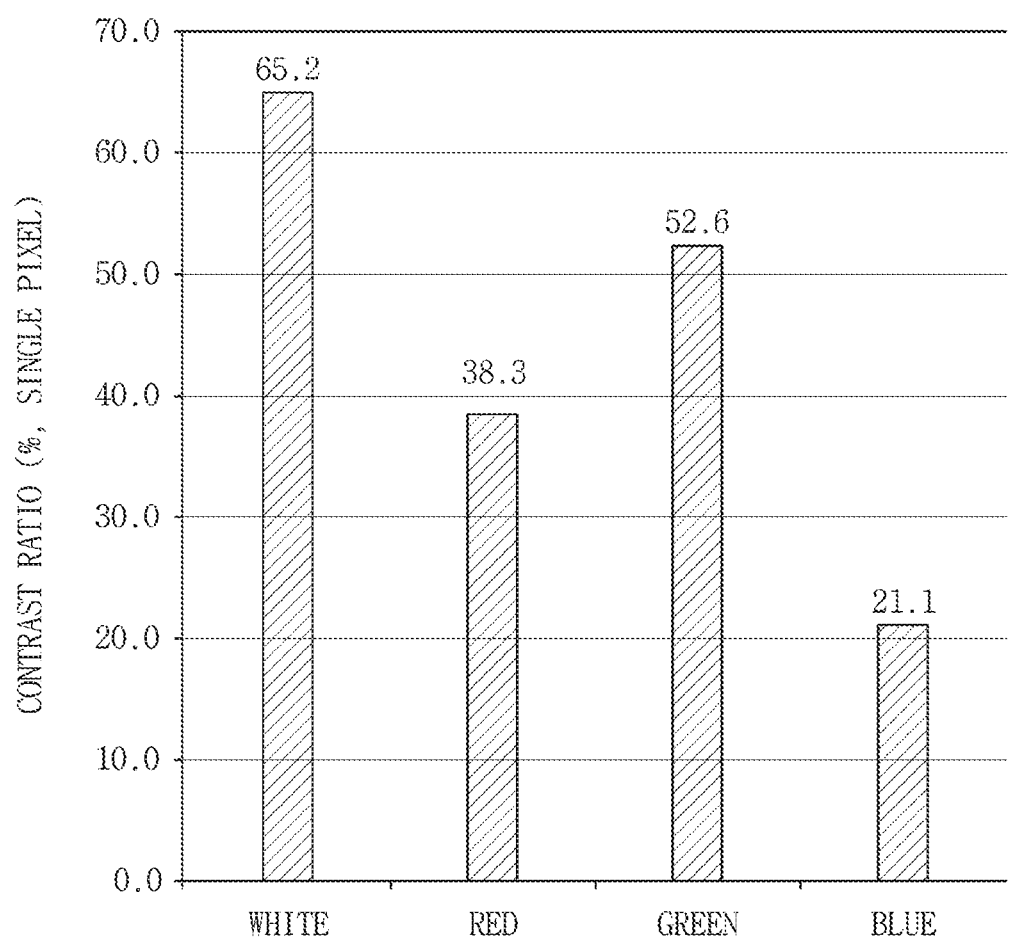
FIGS. 19A and 19B are graphs illustrating a contrast ratio according to color.
Figure 19B:
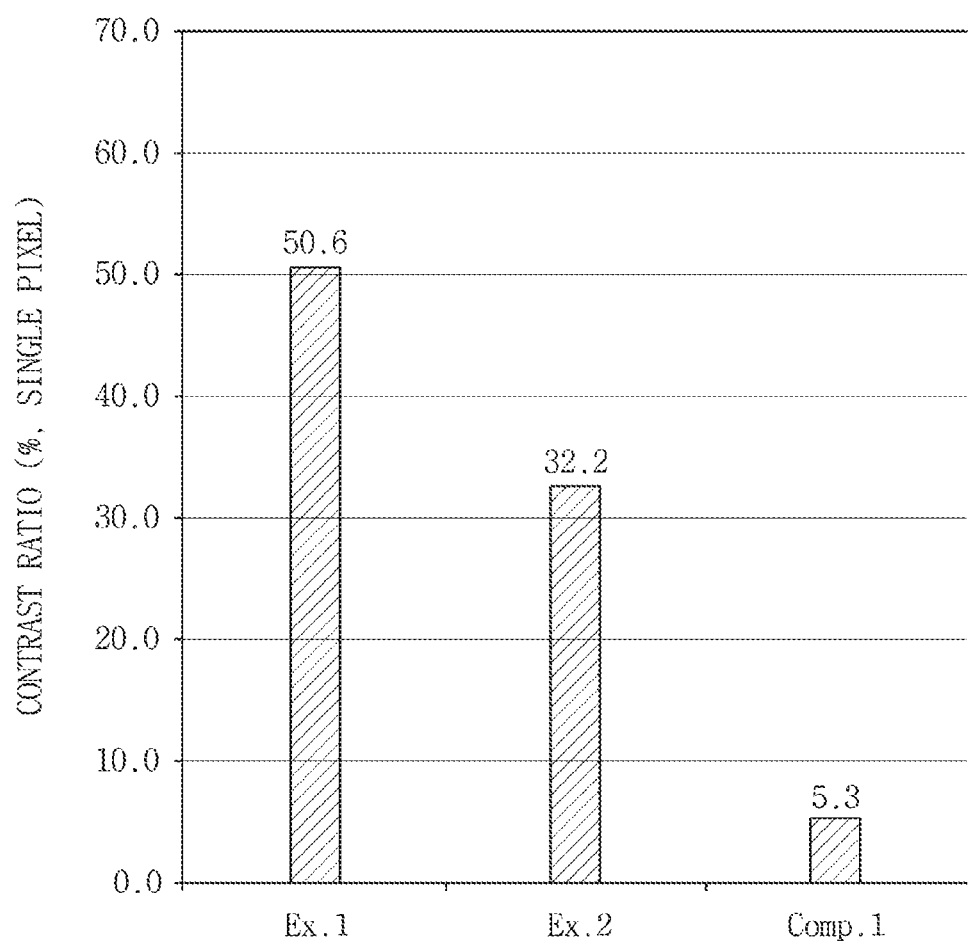

FIGS. 19A and 19B are graphs illustrating a contrast ratio according to color.

FIG. 19A illustrates a contrast ratio of each pixel of a reflective LCD device (i.e., Ex. 1), displaying a single color, which includes a negative C plate having a thickness-direction retardation value Rth of about 180 nm.

Referring to FIG. 19A, a white pixel, a red pixel, a green pixel, and a blue pixel have a contrast ratio of about 20% or higher.

FIG. 19B illustrates a black and white contrast ratio (white luminance/black luminance) of a reflective LCD device including a red pixel, a green pixel, a blue pixel, and a white pixel. In this regard, the black and white contrast ratio may also be referred to as a black contrast ratio.

In FIG. 19B, a reference mark "Comp. 1" represents a black and white contrast ratio of a reflective LCD device not including the negative C-plate, a reference mark "Ex. 1" represents a black and white contrast ratio of a reflective LCD device including a negative C-plate having a thickness-direction phase retardation value Rth of about 180 nm, and a reference mark "Ex. 2" represents a black and white contrast ratio of a reflective LCD device including a negative C-plate having a thickness-direction phase retardation value Rth of about 220 nm.

The black and white contrast ratio of the reflective LCD device (i.e., Comp. 1) not including the negative C-plate is about 5.3%, while the black and white contrast ratio of the reflective LCD device (i.e., Ex. 1) including the negative C-plate having a thickness-direction phase retardation value Rth of about 180 nm is about 50.6%. As such, the black and white contrast ratio of the reflective LCD device (i.e., Ex. 1) including the negative C-plate having the thick-direction phase retardation value Rth of about 180 nm is increased by nine times with respect to the black and white contrast ratio of the reflective LCD device (i.e., Comp. 1) not including the negative C-plate.

Figure 20A:
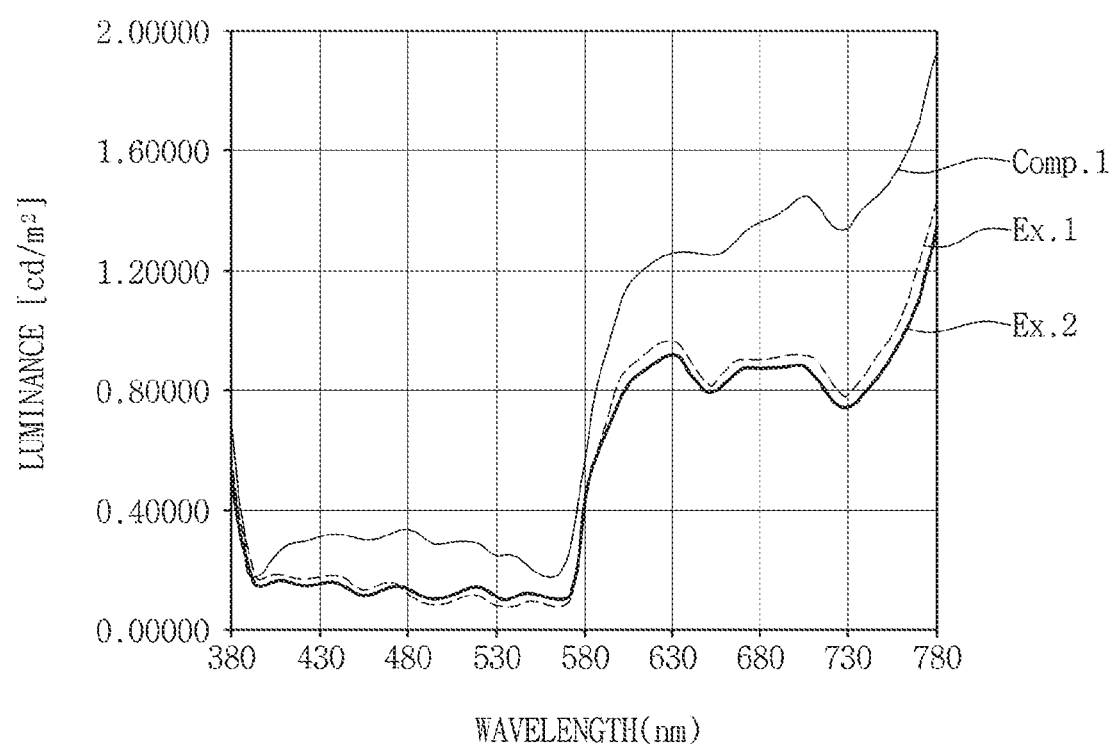
FIG. 20A is a luminance graph of a red color according to a wavelength.
Figure 20B:
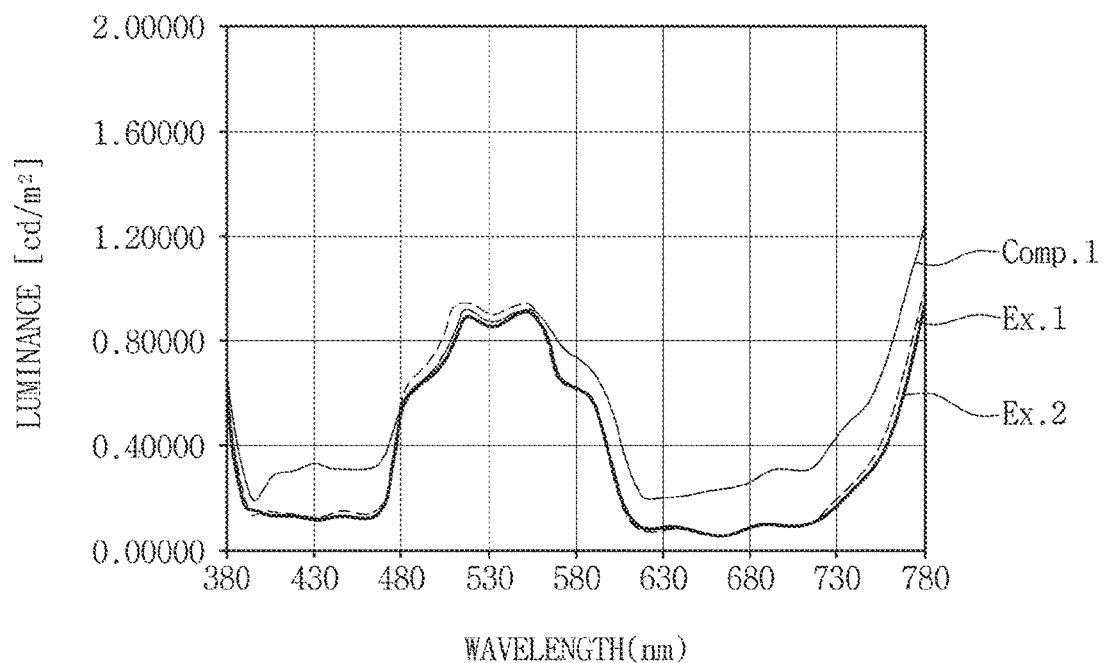
FIG. 20B is a luminance graph of a green color according to a wavelength.
Figure 20C:
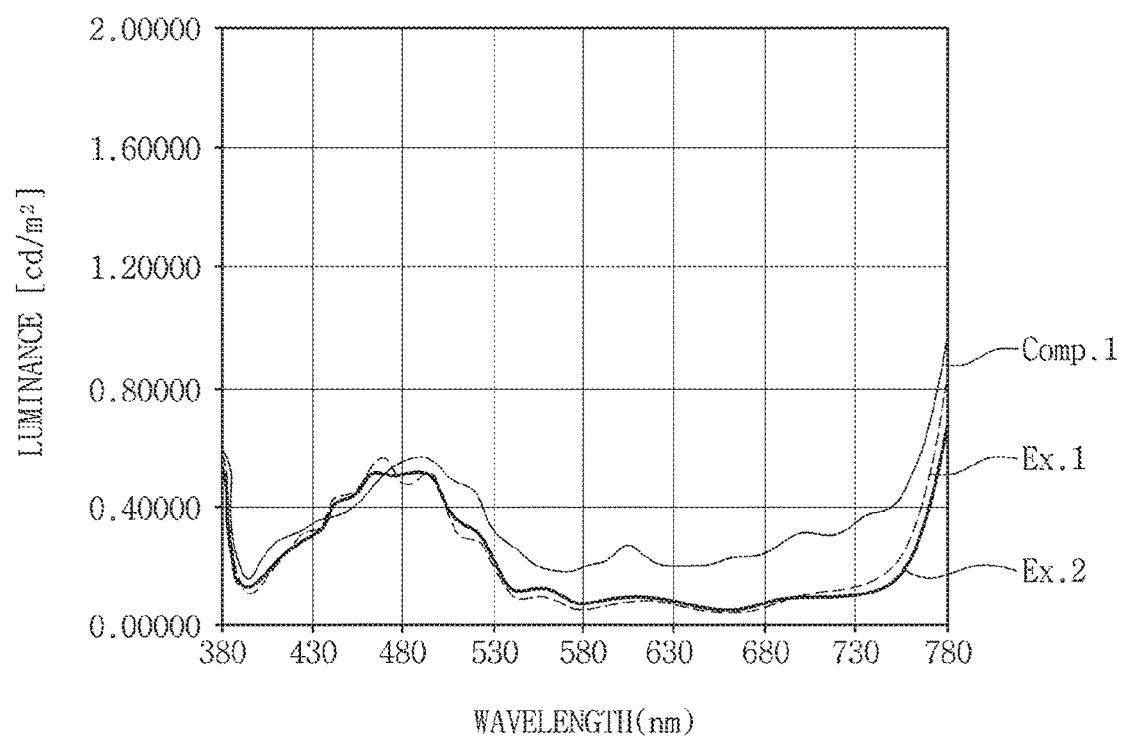
FIG. 20C is a luminance graph of a blue color according to a wavelength.
Figure 20D:
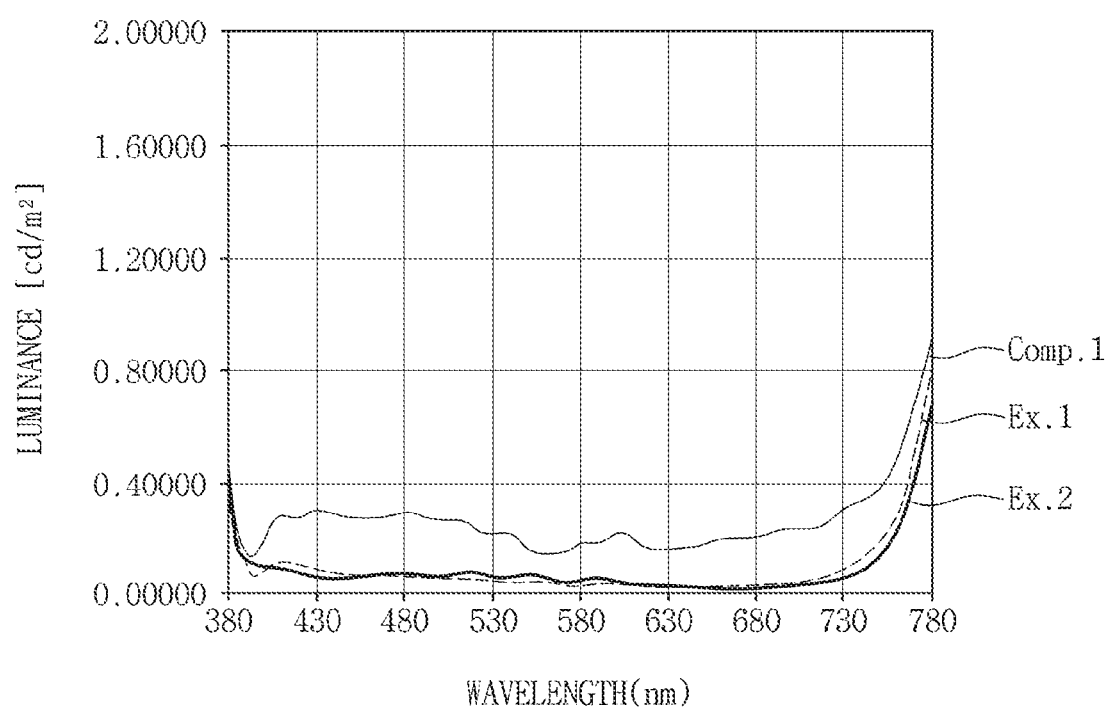
FIG. 20D is a black luminance graph according to a wavelength.

FIG. 20A is a luminance graph of a red color according to a wavelength, FIG. 20B is a luminance graph of a green color according to a wavelength, FIG. 20C is a luminance graph of a blue color according to a wavelength, and FIG. 20D is a black luminance graph according to a wavelength.

FIGS. 20A, 20B, 20C, and 20D respectively illustrate relative luminances according to a wavelength, when red, green, blue, and black colors are displayed on a reflective LCD device including a liquid crystal layer having a thickness, that is, a cell gap, of about 1.6 µm. In FIGS. 20A, 20B, 20C, and 20D, a reference mark "Comp. 1" represents a relative luminance of a color represented on a reflective LCD device not including the negative C-plate, a reference mark "Ex. 1" represents a relative luminance a color represented on a reflective LCD device including a negative C-plate having a thickness-direction phase retardation value Rth of about 180 nm, and a reference mark "Ex. 2" represents a relative luminance of a color represented on a reflective LCD device including a negative C-plate having a thickness-direction phase retardation value Rth of about 220 nm, for example.

Referring to FIG. 20A, as compared to luminance of the reflective LCD device (i.e., Comp. 1) not including the negative C-plate, luminances of the reflective LCD devices (i.e., Ex. 1 and Ex. 2) including the negative C-plate decrease in a red-color wavelength range (i.e., a wavelength of about 600 nm or higher), and the luminances thereof also decrease in a noise wavelength range (i.e., a wavelength of about 580 nm or lower). As such, when the luminance decreases in the noise wavelength range, the red color may be represented more distinctly.

Referring to FIG. 20B, as compared to luminance of the reflective LCD device (i.e., Comp. 1) not including the negative C-plate, luminances of the reflective LCD devices (i.e., Ex. 1 and Ex. 2) including the negative C-plate do not decrease in a green-color wavelength range (i.e., a wavelength ranging from about 480 nm to about 580 nm), whereas the luminances thereof decrease in a noise wavelength range (i.e., a wavelength of about 480 nm or lower and about 580 nm or higher). As such, when the luminance decreases in the noise wavelength range, the green color may be represented more distinctly.

Referring to FIG. 20C, as compared to luminance of the reflective LCD device (i.e., Comp. 1) not including the negative C-plate, luminances of the reflective LCD devices (i.e., Ex. 1 and Ex. 2) including the negative C-plate do not decrease in a blue-color wavelength range (i.e., a wavelength ranging from about 440 nm to about 480 nm), whereas the luminances thereof decrease in a noise wavelength range (i.e., a wavelength of about 480 nm or higher). As such, when the luminance decreases in the noise wavelength range, the blue color may be represented more distinctly.

Referring to FIG. 20D, as compared to luminance of the reflective LCD device (i.e., Comp. 1) not including the negative C-plate, black luminances of the reflective LCD devices (i.e., Ex. 1 and Ex. 2) including the negative C-plates decrease in an entire visible-ray wavelength range. Accordingly, when the black luminance decreases, the contrast ratio of the LCD device increases, and thus the LCD device may display more distinct colors.

The following Table 2 illustrates chromaticity coordinates (Rx, Ry) of a red color, chromaticity coordinates (Gx, Gy) of a green color, and chromaticity coordinates (Bx, By) of a blue color of the LCD device (i.e., Comp. 1) not including the negative C-plate and the LCD devices (i.e., Ex. 1 and Ex. 2) including the negative C-plate, respectively. Table 2 shows values, in the CIE 1931 chromaticity coordinates, of colors displayed on a reflective LCD device including red, green, and blue pixels and a liquid crystal layer having a thickness, i.e., a cell gap, of about 1.6 µm.

A gamut ratio represents a ratio of a range (e.g., area) of color displayed on the display device to the range A1 of color recognized by human beings.

TABLE 2

|  | Comp. 1 | Ex. 1 | Ex. 2 |
|---|---|---|---|
| Rx | 0.456 | 0.514 | 0.509 |
| Ry | 0.320 | 0.324 | 0.334 |
| Gx | 0.302 | 0.286 | 0.289 |

TABLE 2-continued

|  | Comp. 1 | Ex. 1 | Ex. 2 |
|---|---|---|---|
| Gy | 0.447 | 0.516 | 0.518 |
| Bx | 0.246 | 0.177 | 0.186 |
| By | 0.285 | 0.202 | 0.218 |
| Gamut ratio | 10.1% | 29.3% | 26.9% |

Referring to Table 2, the gamut ratio of the LCD device (i.e., Comp. 1) not including the negative C-plate is about 10.1%, while the gamut ratios of the LCD devices (i.e., Ex. 1 and Ex. 2) including the negative C-plates are increased to about 29.3% and about 26.9%, respectively. Accordingly, the LCD (i.e., Ex. 1 and Ex. 2) devices including the negative C-plate may represent a relatively wider range of colors.

Figure 21:
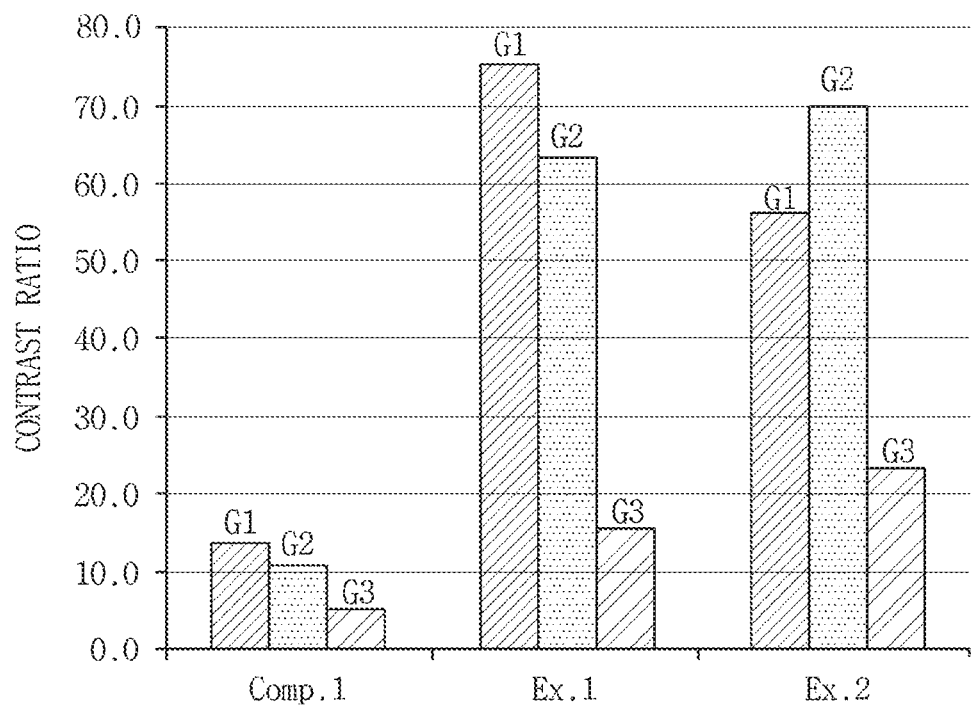
FIG. 21 is a graph illustrating a contrast ratio according to a cell gap of an LCD device.

FIG. 21 is a graph illustrating a contrast ratio according to a cell gap of an LCD device.

For example, FIG. 21 illustrates results of measuring a contrast ratio of an LCD device including a red pixel, a green pixel, a blue pixel, and a white pixel that include a red color filter, a green color filter, a blue color filter, and a white color filter, respectively, each having a thickness of about 0.8 µm.

In FIG. 21, a reference mark "Comp. 1" represents an LCD device not including a light diffusion layer, a reference mark "Ex. 1" represents an LCD device including a negative C-plate having a thickness-direction phase retardation value Rth of about 180 nm, and a reference mark "Ex. 2" represents an LCD device including a negative C-plate having a thickness-direction phase retardation value Rth of about 220 nm.

In addition, a reference mark "G1" represents a case in which a cell gap is about 1.6 µm, a reference mark "G2" represents a case in which the cell gap is about 2.0 µm, and a reference mark "G3" represents a case in which the cell gap is about 2.4 µm.

Referring to FIG. 21, in the case that the LCD device (i.e., Ex. 1) includes the negative C-plate having the thickness-direction phase retardation value Rth of about 180 nm, the contrast ratio is relatively high when the cell gap is about 1.6 µm. In the case that the LCD device (i.e., Ex. 2) includes the negative C-plate having the thickness-direction phase retardation value Rth of about 220 nm, the contrast ratio is relatively high when the cell gap is about 2.0 µm.

Figure 22:
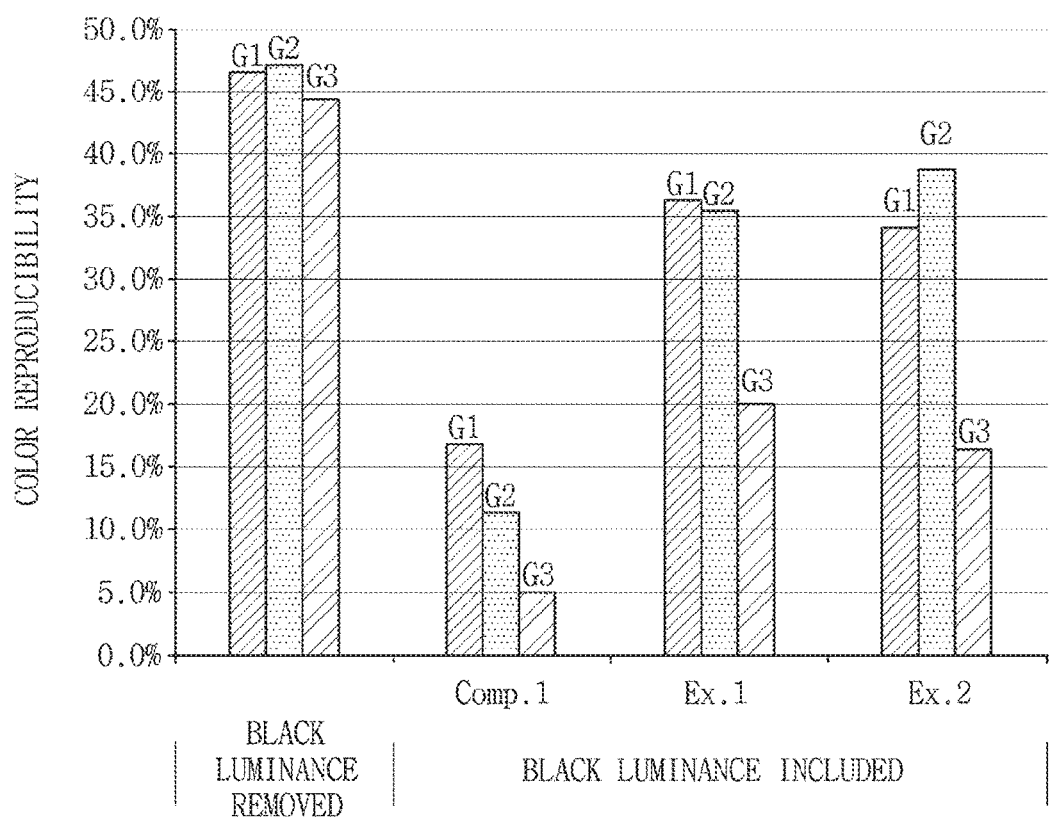
FIG. 22 is a graph illustrating color reproducibility according to a cell gap of an LCD device.

FIG. 22 is a graph illustrating color reproducibility according to a cell gap of an LCD device.

In detail, FIG. 22 illustrates results of measuring color reproducibility of an LCD device including a red pixel, a green pixel, a blue pixel, and a white pixel that include a red color filter, a green color filter, a blue color filter, and a white color filter, respectively, each having a thickness of about 0.8 µm.

In FIG. 22, an item "black luminance removed" shows color reproducibility of a case in which a factor of increasing black luminance based on light incident through a side surface is not taken into account, and an item "black luminance included" shows color reproducibility of a case in which the factor of increasing the black luminance based on the light incident through the side surface is taken into account.

In addition, in the case of "black luminance included," a reference mark "Comp. 1" represents an LCD device not including a light diffusion layer, a reference mark "Ex. 1" represents an LCD device including a negative C-plate having a thickness-direction phase retardation value Rth of about 180 nm, and a reference mark "Ex. 2" represents an LCD device including a negative C-plate having a thickness-direction phase retardation value Rth of about 220 nm.

In addition, a reference mark "G1" represents a case in which a cell gap is about 1.6 µm, a reference mark "G2" represents a case in which the cell gap is about 2.0 µm, and a reference mark "G3" represents a case in which the cell gap is about 2.4 µm.

Referring to FIG. 22, when that the factor of increasing the black luminance by the light incident through the side surface is taken into account (black luminance included), in the case that the LCD device (i.e., Ex. 1) includes the negative C-plate having the thickness-direction phase retardation value Rth of about 180 nm, the color reproducibility is relatively excellent when the cell gap is about 1.6 µm. In addition, in the case that the LCD device (i.e., Ex. 2) includes the negative C-plate having the thickness-direction phase retardation value Rth of about 220 nm, the color reproducibility is relatively excellent when the cell gap is about 2.0 µm.

As set forth above, according to one or more exemplary embodiments, an optical film has light directivity and blocks unnecessary reflected light to improve a contrast ratio of an LCD device. Further, according to one or more exemplary embodiments, the reflective LCD device has an excellent contrast ratio and excellent display properties.

From the foregoing, it will be appreciated that various embodiments in accordance with the invention have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other exemplary embodiments can be mixed and matched in any manner, to produce further exemplary embodiments consistent with the invention.

What is claimed is:

1. An optical film comprising:
    a negative C-plate;
    a light diffusion layer which is disposed on the negative C-plate and comprises:
        a first light-transmissive base; and
        a plurality of first rods which are disposed in the first light-transmissive base, have a refractive index different from a refractive index of the first light-transmissive base and are aligned at a first inclination angle with respect to a normal line of the first light-transmissive base;
        a plurality of second rods which are disposed in the first light-transmissive base, have a refractive index different from the refractive index of the first light-transmissive base and are aligned at a second inclination angle with respect to the normal line of the first light-transmissive base, the second inclination angle being different from the first inclination angle; and
    a polarizer which is disposed on the negative C-plate and comprises a linear polarizer and a retardation plate on the linear polarizer,
    wherein:
        the negative C-plate has an x-axis refractive index, a y-axis refractive index, and a z-axis refractive index,
        the x-axis refractive index is greater than the z-axis refractive index and the y-axis refractive index is greater than the z-axis refractive index,
        at least one of the plurality of first rods and at least one of the plurality of second rods are disposed in a substantially same height in the normal line such that the at least one of the plurality of first rods and the at least one of the plurality of second rods substantially overlap each other in a direction of a main extension plane of the first light-transmissive base, the negative C-plate has a surface-direction retardation value in a range of about 0 nm to about 5 nm, and the negative C-plate has a thickness-direction retardation value in a range of about 192.5 nanometers to about 242.5 nanometers.

2. The optical film as claimed in claim 1, wherein the retardation plate comprises a quarter wave plate.

3. The optical film as claimed in claim 2, wherein the retardation plate comprises a half wave plate.

4. The optical film as claimed in claim 1, wherein the light diffusion layer is disposed between the linear polarizer and the negative C-plate.

5. The optical film as claimed in claim 1, wherein the light diffusion layer is disposed on a surface of the polarizer, and
the negative C-plate is disposed on another surface of the polarizer.

6. The optical film as claimed in claim 1, wherein the first inclination angle is in a range of about 0 degree to about 5 degrees.

7. The optical film as claimed in claim 1, wherein the second inclination angle is in a range of about 5 degrees to about 20 degrees.

8. The optical film as claimed in claim 1, wherein the x-axis refractive index and the y-axis refractive index are the same as each other.

9. The optical film as claimed in claim 1, wherein the negative C-plate has a thickness in a range of about 1 micrometer to about 30 micrometers.

10. The optical film as claimed in claim 1, wherein the negative C-plate comprises a discotic compound.

11. The optical film as claimed in claim 1, wherein the negative C-plate comprises at least one of polyarylate, polynorbornene, polycarbonate, polysulfone, polyimide, cellulose and derivatives thereof.

12. A liquid crystal display device comprising:
a first substrate;
a second substrate opposing the first substrate;
a liquid crystal layer between the first substrate and the second substrate; and
an optical film which is disposed on the second substrate and comprises:
  a negative C-plate;
  a light diffusion layer which is disposed on the negative C-plate and comprises:
    a first light-transmissive base; and
    a plurality of first rods which are disposed in first light-transmissive base, have a refractive index from a refractive index of the first light-transmissive base and aligned at a first inclination angle with respect to a normal line of the first light-transmissive base;
    a plurality of second rods which are disposed in the first light-transmissive base, have a refractive index different from the refractive index of the first light-transmissive base and are aligned at a second inclination angle with respect to the normal line of the first light-transmissive base, the second inclination angle being different from the first inclination angle; and
  a polarizer which is disposed on the negative C-plate and comprises a linear polarizer and a retardation plate on the linear polarizer, wherein:
the negative C-plate has an x-axis refractive index, a y-axis refractive index, and a z-axis refractive index,
the x-axis refractive index is greater than the z-axis refractive index and the y-axis refractive index is greater than the z-axis refractive index,
at least one of the plurality of first rods and at least one of the plurality of second rods are disposed in a substantially same height in the normal line such that the at least one of the plurality of first rods and the at least one of the plurality of second rods substantially overlap each other in a direction of a main extension plane of the first light-transmissive base,
the negative C-plate has a surface-direction retardation value in a range of about 0 nm to about 5 nm, and
the negative C-plate has a thickness-direction retardation value in a range of about 192.5 nanometers to about 242.5 nanometers.

13. The liquid crystal display device as claimed in claim 12, further comprising:
a reflection layer on the first substrate; and
a pixel electrode on the reflection layer.

14. The liquid crystal display device as claimed in claim 13, wherein the reflection layer is insulated from the pixel electrode.

15. The liquid crystal display device as claimed in claim 13, wherein the reflection layer is electrically connected to the pixel electrode.

16. The liquid crystal display device as claimed in claim 12, wherein the retardation plate comprises a quarter wave plate.

17. The liquid crystal display device as claimed in claim 16, wherein the retardation plate further comprises a half wave plate.

18. The liquid crystal display device as claimed in claim 12, wherein the negative C-plate is disposed between the polarizer and the second substrate.

19. The liquid crystal display device as claimed in claim 16, further comprising:
a pixel electrode on the reflection layer; and
a common electrode disposed on the second substrate and opposing the pixel electrode.

20. The liquid crystal display device as claimed in claim 19, wherein an interval between the pixel electrode and the common electrode is in a range of about 1.4 micrometers to about 1.6 micrometers.

21. A liquid crystal display device comprising:
a liquid crystal display panel comprising:
  a first substrate;
  a thin film transistor disposed on the first substrate;
  a pixel electrode disposed on and connected to the thin film transistor;
  a liquid crystal layer disposed on the pixel electrode;
  a common electrode disposed on the liquid crystal layer; and
  a second substrate disposed on the common electrode;
a negative C-plate disposed on the liquid crystal display panel;
a polarizer disposed on the negative C-plate; and
a light diffusion layer which is disposed on the negative C-plate and comprises:
  a first light-transmissive base;
  a plurality of first rods which are disposed in the first light-transmissive base, have a different refractive index from a refractive index of the first light-transmissive base and are aligned at a first inclination angle with respect to a normal line of the first light-transmissive base; and a plurality of second rods which are disposed in the first light-transmissive base, have a different refractive index from the refractive index of the first light-transmissive base and aligned at a second inclination angle with respect to the normal line of the first light-transmissive base, wherein:

the second inclination angle is different from the first inclination angle, at least one of the plurality of first rods and at least one of the plurality of second rods are disposed in a substantially same height in the normal line such that the at least one of the plurality of first rods and the at least one of the plurality of second rods substantially overlap each other in a direction of a main extension plane of the first light-transmissive base, the negative C-plate has a surface-direction retardation value in a range of about 0 nm to about 5 nm, and the negative C-plate has a thickness-direction retardation value in a range of about 192.5 nanometers to about 242.5 nanometers.

22. The liquid crystal display device as claimed in claim 21, wherein the plurality of first rods and the plurality of second rods are alternately disposed in a longitudinal direction and a transversal direction of the light diffusion layer.

23. The liquid crystal display device as claimed in claim 21, wherein first rods of the plurality of first rods are disposed in a first line, and second rods of the plurality of second rods are disposed in a second line adjacent to and parallel to the first line.

* * * * *